US011524232B2

(12) United States Patent
Fajt et al.

(10) Patent No.: US 11,524,232 B2
(45) Date of Patent: *Dec. 13, 2022

(54) SYSTEMS AND METHOD FOR MANAGING PERMISSION FOR INTERACTING WITH VIRTUAL OBJECTS BASED ON VIRTUAL PROXIMITY

(71) Applicant: Rec Room Inc., Seattle, WA (US)

(72) Inventors: Nicholas Fajt, Seattle, WA (US);
Cameron Brown, Seattle, WA (US);
Dan Kroymann, Seattle, WA (US);
Omer Bilal Orhan, Seattle, WA (US);
Johnathan Bevis, Seattle, WA (US);
Joshua Wehrly, Seattle, WA (US)

(73) Assignee: Rec Room Inc., Seattle, WA (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/100,729

(22) Filed: Nov. 20, 2020

(65) Prior Publication Data
US 2021/0069589 A1    Mar. 11, 2021

Related U.S. Application Data

(63) Continuation of application No. 16/312,931, filed as application No. PCT/US2017/039800 on Jun. 28, 2017, now Pat. No. 10,843,073.
(Continued)

(51) Int. Cl.
*A63F 13/00* (2014.01)
*A63F 13/40* (2014.01)
(Continued)

(52) U.S. Cl.
CPC .............. *A63F 13/40* (2014.09); *A63F 13/55* (2014.09); *A63F 13/73* (2014.09); *A63F 13/79* (2014.09);
(Continued)

(58) Field of Classification Search
CPC ........ A63F 13/352; A63F 13/55; A63F 13/79; A63F 2300/5533; A63F 2300/575; A63F 2300/8082; G06F 3/011; G06T 2219/024
See application file for complete search history.

(56) References Cited

U.S. PATENT DOCUMENTS 7,881,315 B2    2/2011    Haveson et al.
8,191,001 B2    5/2012    Van Wie et al.
(Continued)

FOREIGN PATENT DOCUMENTS

WO    2009/109784 A1    9/2009
WO    2012/155179 A1    11/2012

OTHER PUBLICATIONS

Gonzalez-Franco, M., et al., "Framework for Remote Collaborative Interaction in Virtual Environments Based on Proximity," Proceedings of the IEEE Symposium on 3D User Interfaces 2015, Mar. 23-24, 2015, Arles, France, 2 pages.
(Continued)

*Primary Examiner* — Lawrence S Galka
(74) *Attorney, Agent, or Firm* — Christensen O'Connor Johnson Kindness PLLC

(57) ABSTRACT

In some embodiments, techniques for managing interaction permissions for an object in a shared virtual environment are provided. The techniques may determine whether to present an object in a limited-interaction mode or in an interactive mode based on a permission condition. The permission condition may include a proximity condition that specifies a proximity threshold between two objects within the shared virtual environment that should be met in order to provide the object in the interactive mode. The proximity threshold may specify a distance between an avatar of an owning user of the object and the object; a distance between an avatar of
(Continued)

an owning user of the object and an avatar of a user being presented the object, or other distances.

20 Claims, 13 Drawing Sheets

Related U.S. Application Data

(60) Provisional application No. 06/282,016.

(51) Int. Cl.
*G06T 15/20* (2011.01)
*A63F 13/55* (2014.01)
*A63F 13/73* (2014.01)
*A63F 13/79* (2014.01)

(52) U.S. Cl.
CPC ...... *G06T 15/20* (2013.01); *A63F 2300/5533* (2013.01); *A63F 2300/8082* (2013.01)

(56) References Cited

U.S. PATENT DOCUMENTS

| | | |
|---|---|---|
| 8,805,773 B2 | 8/2014 | Fiedler |
| 9,038,127 B2 | 5/2015 | Hastings et al. |
| 9,545,565 B1 | 1/2017 | Kornmann et al. |
| 9,656,161 B1 | 5/2017 | Bowman et al. |
| 2009/0037822 A1 | 2/2009 | Kandekar et al. |
| 2009/0070180 A1 | 3/2009 | Jung et al. |
| 2009/0138355 A1 | 5/2009 | Jung et al. |
| 2011/0231781 A1 | 9/2011 | Betzler et al. |
| 2012/0210254 A1 | 8/2012 | Fukuchi et al. |
| 2015/0134481 A1 | 5/2015 | Glickfield et al. |
| 2015/0254793 A1 | 9/2015 | Hastings et al. |
| 2016/0342774 A1 | 11/2016 | Henkel-Wallace et al. |
| 2017/0123750 A1 | 5/2017 | Todasco |
| 2019/0253848 A1 | 8/2019 | Nguyen |

OTHER PUBLICATIONS

International Search Report and Written Opinion dated Oct. 26, 2017, issued in corresponding International Application No. PCT/US2017/039800, filed Jun. 28, 2017, 9 pages.

Schuwerk, C., et al., "An Area-of-Interest Based Communication Architecture for Shared Haptic Virtual Environments," Proceedings of the 2013 IEEE International Symposium on Haptic Audio Visual Environments and Games (HAVE), Oct. 26-27, 2013, Istanbul, 6 pages.

SYSTEMS AND METHOD FOR MANAGING PERMISSION FOR INTERACTING WITH VIRTUAL OBJECTS BASED ON VIRTUAL PROXIMITY

CROSS-REFERENCE(S) TO RELATED APPLICATION(S)

This application is a continuation of application Ser. No. 16/312,931, filed Dec. 21, 2018, which is application is a National Stage of International Application No. PCT/US2017/039800, filed Jun. 28, 2017, which claims the priority of Provisional Application No. 62/355,671, filed Jun. 28, 2016. The entireties of each of the aforementioned patent applications are hereby incorporated herein by reference.

The present application is related to International Patent Application No. PCT/US2017/039799, filed Jun. 28, 2017, entitled SYSTEMS AND METHODS FOR TRANSFERRING OBJECT AUTHORITY IN A SHARED VIRTUAL ENVIRONMENT; International Patent Application No. PCT/US2017/039801, filed Jun. 28, 2017, entitled SYSTEMS AND METHODS PROVIDING TEMPORARY DECOUPLING OF USER AVATAR SYNCHRONICITY FOR PRESENCE ENHANCING EXPERIENCES; International Patent Application No. PCT/US2017/039824, filed Jun. 28, 2017, entitled SYSTEMS AND METHODS FOR ASSISTING VIRTUAL GESTURES BASED ON VIEWING FRUSTUM; and International Patent Application No. PCT/US2017/039826, filed Jun. 28, 2017, entitled SYSTEMS AND METHODS FOR DETECTING COLLABORATIVE VIRTUAL GESTURES, the entire disclosures of which are hereby incorporated by reference herein for all purposes.

BACKGROUND

Virtual environments such as virtual reality environments, augmented reality environments, and the like, are growing in popularity. For such environments to be successful, it is important for the presentation of the environment to be as immersive as possible. Difficulties in providing immersiveness can arise in these systems, however, particularly when multiple users are participating in the same virtual environment to create a shared virtual environment. What is desired are systems and techniques that can improve immersiveness in shared virtual environments.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of controlling access to an object within a shared virtual environment is provided. A first endpoint system receives object data indicating an owned object to be presented within the shared virtual environment. The first endpoint system determines at least one distance within the shared virtual environment between two or more objects, wherein the two or more objects include an avatar of an owner of the owned object. In response to determining that the at least one distance satisfies at least one proximity condition, the first endpoint system presents the owned object within the shared virtual environment in an interactive mode. In response to determining that the distance does not satisfy the at least one proximity condition, the first endpoint system presents the owned object within the shared virtual environment in a limited-interaction mode.

In some embodiments, a non-transitory computer-readable medium is provided. The computer-readable medium has computer-executable instructions stored thereon that, in response to execution by one or more processors of a computing device, cause the computing device to perform a method as described above.

In some embodiments, an endpoint system is provided. The endpoint system comprises a head-mounted display device; at least one handheld controller device; at least one motion sensor device; and an endpoint computing device. The endpoint computing device is communicatively coupled to the head-mounted display device, the at least one handheld controller device, and the at least one motion sensor device. The endpoint system is configured to perform the method as described above.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
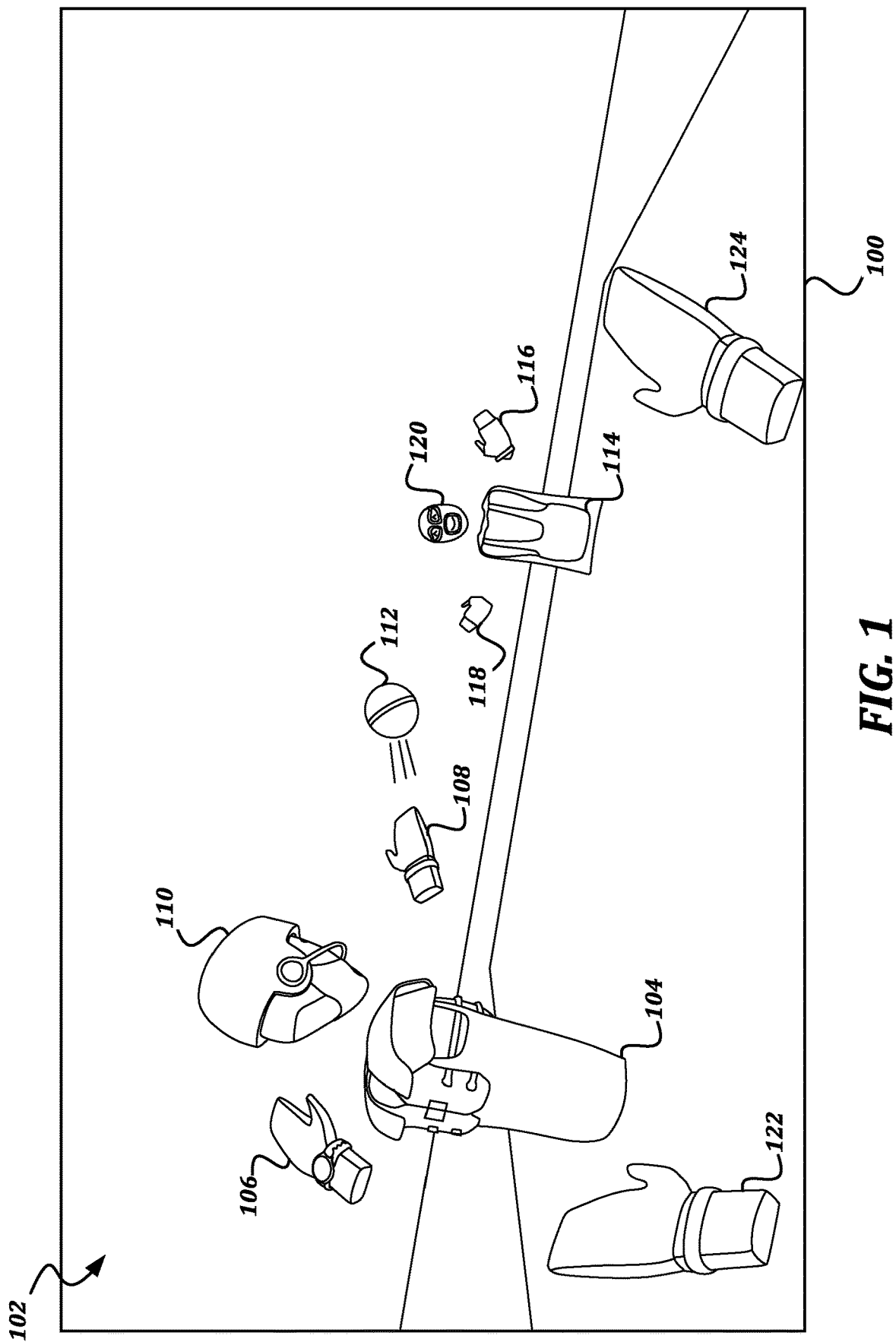
FIG. 1 is an illustration of an example embodiment of a shared virtual environment according to various aspects of the present disclosure.

FIG. 1 is an illustration of an example embodiment of a shared virtual environment according to various aspects of the present disclosure. In FIG. 1, a display 100 of a head-mounted display device is illustrated, showing a view of a shared virtual environment 102 presented to a user via the head-mounted display device. The shared virtual environment 102 is a virtual room in which two or more users may interact with each other and/or with objects within the shared virtual environment through avatars. As shown, the view is a first-person view of the shared virtual environment 102, and two avatars can be seen. A first avatar has a head 110, a torso 104, a left hand 106 and a right hand 108. A second avatar also has a head 120, a left hand 116, a right hand 118, and a torso 114. In the illustrated scene, the first avatar has just thrown a ball 112 towards the second avatar. Because the scene is a first-person view, the user can also see a left hand 122 and a right hand 124 that correspond to the user's own avatar. This scene is an illustrative example to establish context for the rest of the disclosure, and should not be seen as limiting to any specific type of avatar, object, or virtual room.

Figure 2:
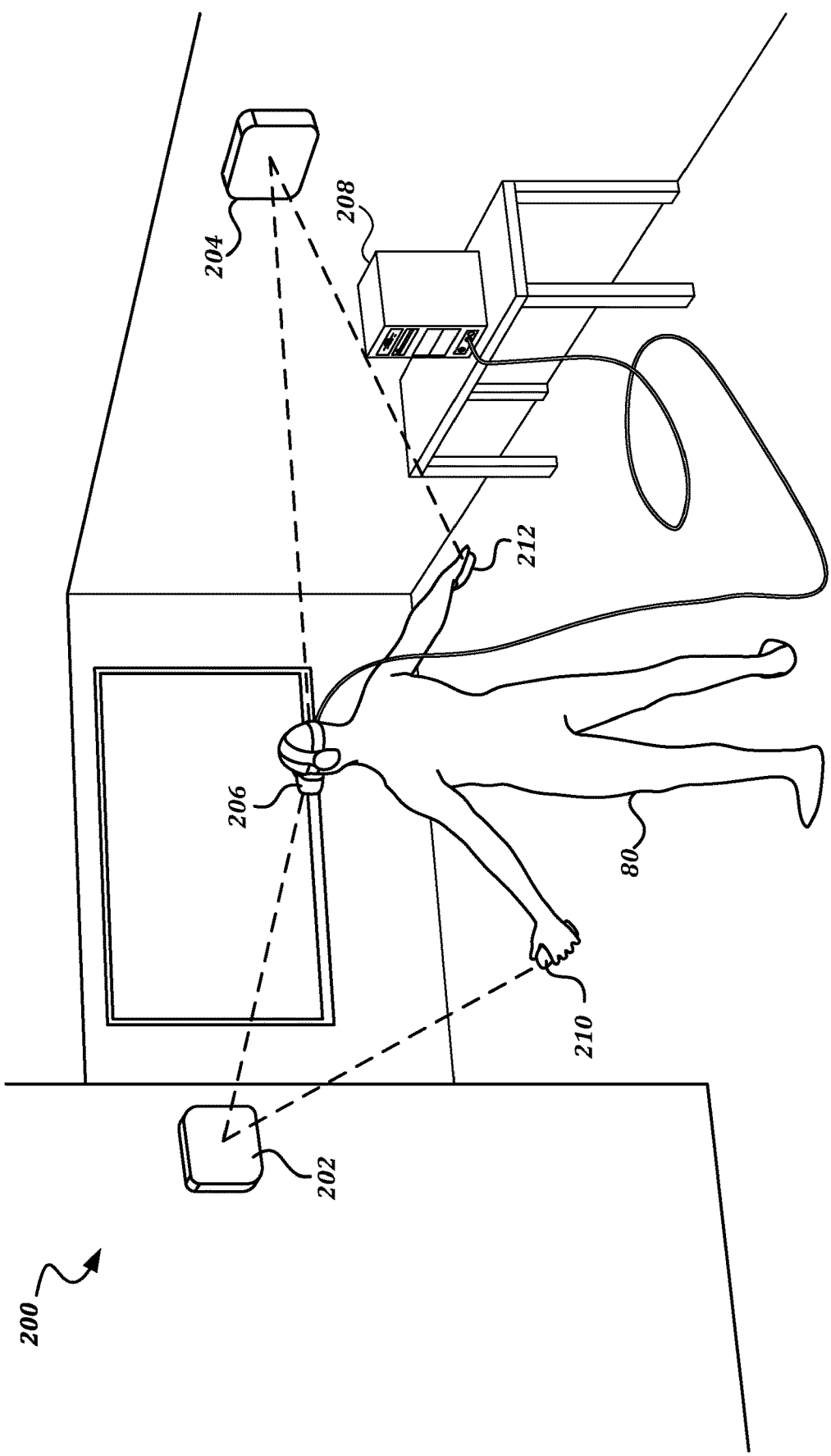
FIG. 2 is an illustration of a user interacting with an example embodiment of an endpoint system according to various aspects of the present disclosure.

Each avatar in the shared virtual environment is associated with an endpoint system. FIG. 2 is an illustration of a user interacting with an example embodiment of an endpoint system according to various aspects of the present disclosure. The user 80 is in a room 200 that has been configured with an endpoint system. An endpoint computing device 208 is connected to a head-mounted display device 206 worn by the user 80 via a cable. The user 80 holds a first handheld controller device 210 in one hand, and a second handheld controller device 212 in the other hand. One or more motion sensor devices 202, 204 are arranged around the room 200, and detect the position and/or motion of the head-mounted display device 206 and the handheld controller devices 210, 212 within the room 200. The endpoint computing device 208 may use the detected positions and/or motions of the handheld controller devices 210, 212 to control the hands of the avatar 122, 124 within the shared virtual environment 102. The endpoint computing device 208 may use the detected positions and/or motions of the head-mounted display device 206 to move the avatar associated with the endpoint system within the shared virtual environment 102, and to move the viewpoint rendered by the head-mounted display device 206 within the shared virtual environment 102. Further details regarding each of these components are provided below.

To provide an immersive shared virtual environment, it would be helpful to be able to share objects, as people can do in the real world. However, it is also desirable to be able to limit access to some objects. For example, it may be desirable to only allow permission to interact with certain objects to users who have been given permission to do so. Permission could be restricted for many reasons, including but not limited to being able to sell permission to access the objects, being able to provide protection from theft or unwanted use by users other than the owner of the object, and so on.

Traditional systems may provide specific permissions on a user-by-user basis. In other words, each user either has permission to use the object or does not, and these permissions are recorded persistently by the system. This traditional method of managing permissions is not flexible enough to provide immersive shared virtual environments, because interactive objects may be owned by a first user, but then be shared by the first user with other users in an ad hoc manner. For example, the first user may have a virtual ball, and may throw the virtual ball to another user. As another example, the first user may have access to a virtual board game, and may invite other users to play the board game. If the first user has to first configure permissions for each other user for them to share the object, the immersiveness of the experience is broken, because the first user would otherwise expect to be able to share their objects with other users.

One way of addressing this issue would be to have the objects owned by the first user disappear from the shared virtual environment if the first user is not present in the shared virtual environment, but this would harm the immersiveness for other users as the first user's objects would come into and out of existence. What is desired are methods and systems that can allow permissions over virtual objects to be shared dynamically, but otherwise be controlled against unwanted access.

Figure 3A:
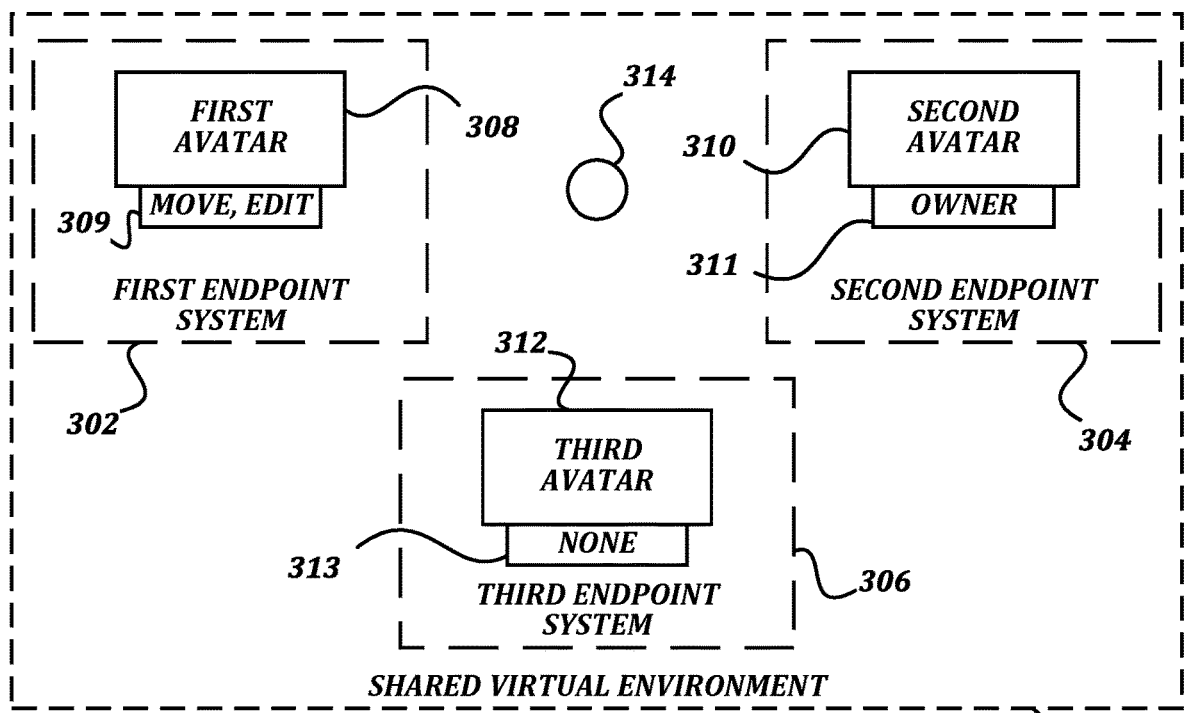
FIGS. 3A and 3B are schematic illustrations that show sharing permission to interact with an object within a shared virtual environment according to various aspects of the present disclosure.
Figure 3B:
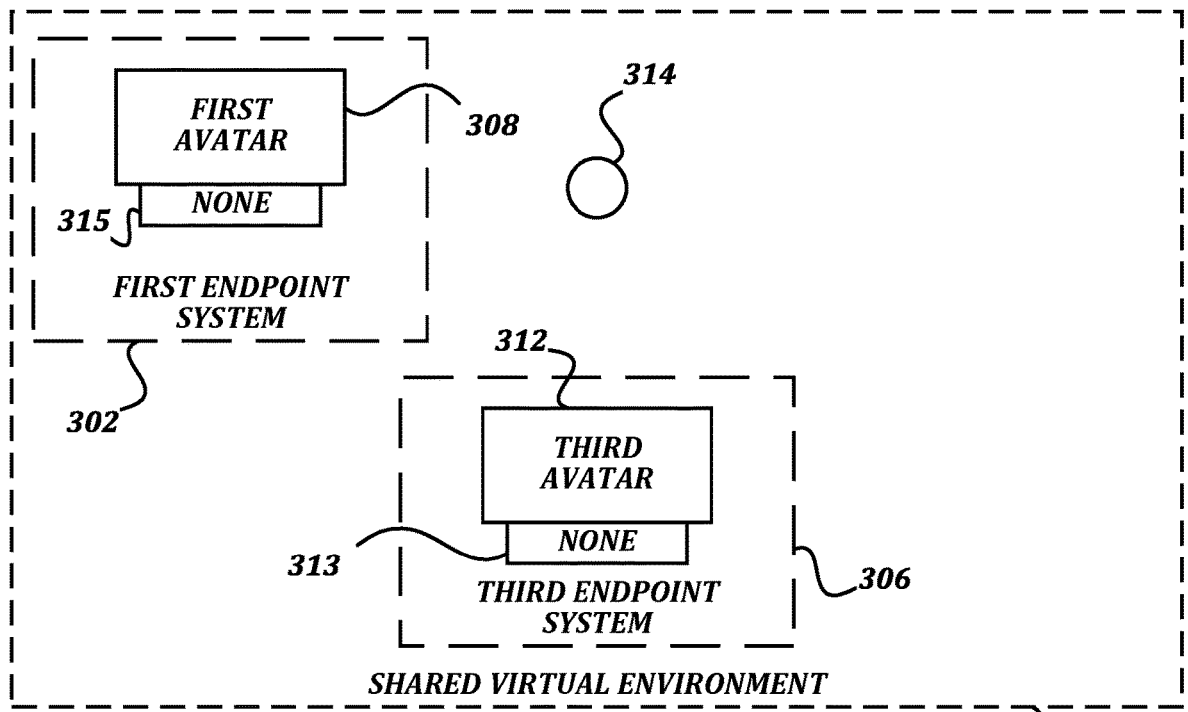

FIGS. 3A and 3B are schematic illustrations that show the sharing of permission to interact with an object within a shared virtual environment according to various aspects of the present disclosure. As illustrated in FIG. 3A, a first endpoint system 302, a second endpoint system 304, and a third endpoint system 306 are participating in the shared virtual environment 300. The first endpoint system 302 is associated with a first avatar 308 representing a first user, the second endpoint system 310 is associated with a second avatar 310 representing a second user, and the third endpoint system 306 is associated with a third avatar 312 representing a third user. The shared virtual environment may include many shared objects, but a single shared object, a ball 314, is illustrated for ease of discussion.

In FIG. 3A, the second user of the second endpoint system 304 is the owner of the owned object 314, as indicated by the owner tag 311. As the owner 311, the second endpoint system 304 has full permission to interact with the owned object 314, which may include permissions to perform actions including but not limited to moving the object, editing characteristics of the object, destroying the object, executing functionality of the object, and presenting media embedded in the object. Because the first endpoint system 302 has determined that a permission condition has been met, it is allowed to experience the owned object 314 in an interactive mode. As illustrated, the interactive mode includes the permission to move and edit 309 the owned object 314. As discussed further below, the permission condition may include a threshold for a virtual distance between the second avatar 310 and the owned object 314, a virtual distance between the second avatar 310 and the first avatar 308, and/or other factors. Because the third endpoint system 306 has not determined that a permission condition has been met, no permissions 313 have been granted to the third endpoint system 306, and the third endpoint system 306 presents the owned object 314 in a limited-interaction mode.

FIG. 3B illustrates the same shared virtual environment 300, but without the owner being present. In this case, the owned object 314 may still be presented, but because the owner is no longer present in the shared virtual environment, the permission condition that granted the first endpoint system 302 the move and edit permissions is no longer met, and so no permissions 315 are given to the first endpoint system 302. The first endpoint system 302 will now present the owned object 314 in the limited-interaction mode, as will the third endpoint system 306. Further details of how such virtual proximity-based sharing of permissions may be implemented are provided below.

Figure 4:
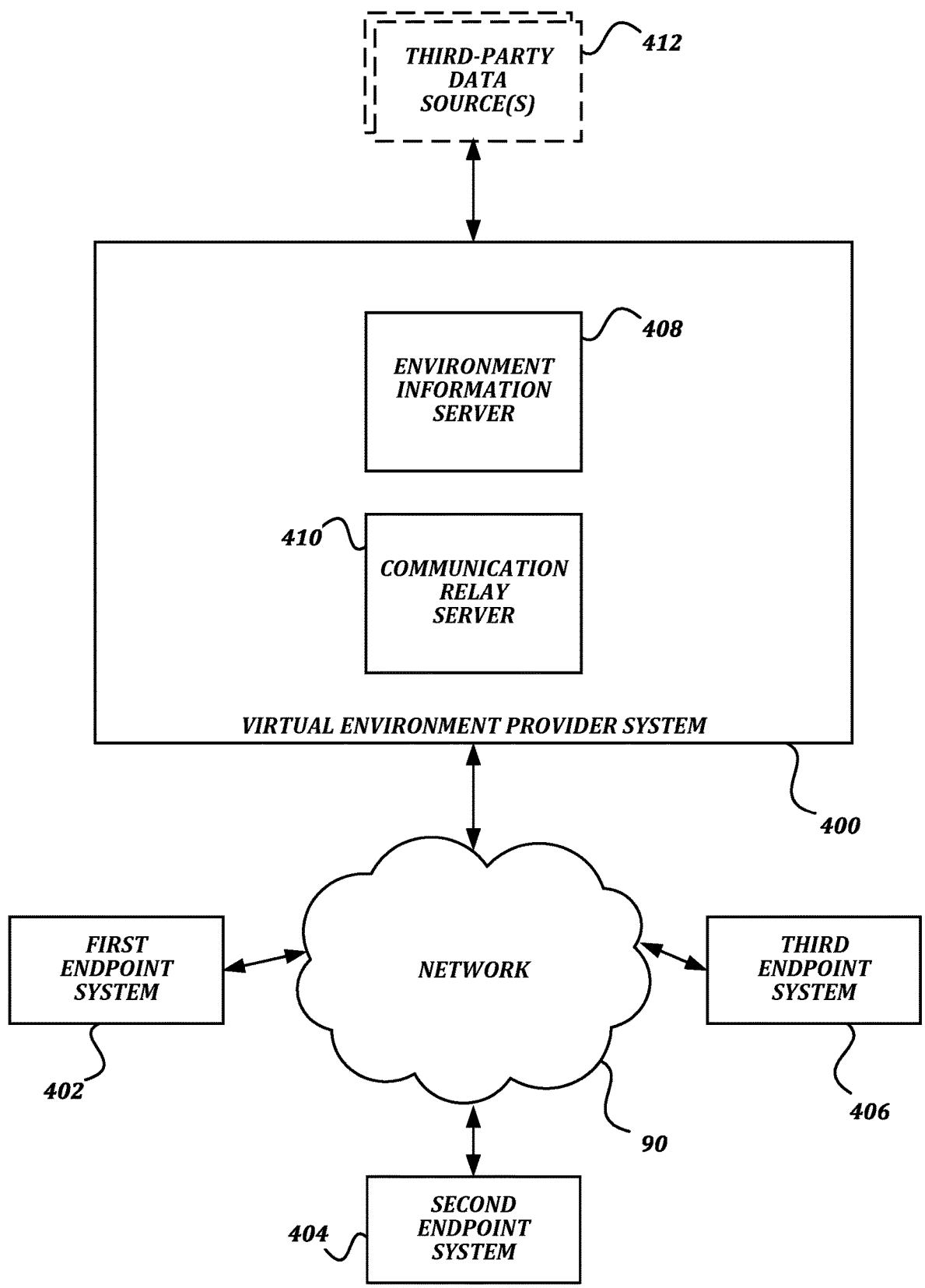
FIG. 4 is a block diagram that illustrates an example embodiment of a virtual environment provider system according to various aspects of the present disclosure.

FIG. 4 is a block diagram that illustrates an example embodiment of a virtual environment provider system according to various aspects of the present disclosure. In the illustrated embodiment, the virtual environment provider system 400 includes an environment information server 408 and a communication relay server 410.

In some embodiments, the environment information server 408 is primarily responsible for managing persistent information relating to providing the shared virtual environment. For example, the environment information server 408 may manage user account information, preferences, long-lived virtual object information, and/or other information. In some embodiments, the communication relay server 410 is primarily responsible for distributing notifications received from endpoint systems to other endpoint systems. The communication relay server 410 may also extract some data for temporary storage from the notifications that pass through it. Further description of the functionality provided by the environment information server 408 and the communication relay server 410 is provided below.

Each server of the virtual environment provider system 400 may be one or more computing devices. In some embodiments, the environment information server 408 and the communication relay server 410 may be merged to be provided by a single computing device. In some embodiments, the virtual environment provider system 400 may include a plurality of computing devices that interchangeably provide the functionality of both servers 408, 410. In some embodiments, the servers 408, 410 of the virtual environment provider system may be provided using a cloud computing service. In some embodiments, the virtual environment provider system 400 may be co-located with (or may be provided by) the same computing devices as one of the endpoint systems 402-406. In some embodiments, the virtual environment provider system 400 is remote from the endpoint systems 402-406.

In the illustrated embodiment, the virtual environment provider system 400 communicates with a plurality of endpoint systems, including a first endpoint system 402, a second endpoint system 404, and a third endpoint system 406 via a network 90. In some embodiments, there may be more or fewer than three endpoint systems communicating with each other and the virtual environment provider system 400, though three are illustrated herein in order to describe the functionality of the system. Connections via the network 90 may be implemented using any combination of suitable wired and/or wireless communication technology, including but not limited to Ethernet, fiber-optics, WiFi, 2G, 3G, LTE, WiMAX, and Bluetooth.

In the illustrated embodiment, the virtual environment provider system 400 may optionally communicate with one or more third-party data sources 412. Third-party data sources 412 may be run by different parties than the virtual environment provider system 400, and may be used to provide enhanced content within the virtual environment provider system 400. Some examples of third-party data sources 412 include, but are not limited to, social networking services, billing services, providers of third-party content such as virtual objects, and media providing services.

Figure 5A:
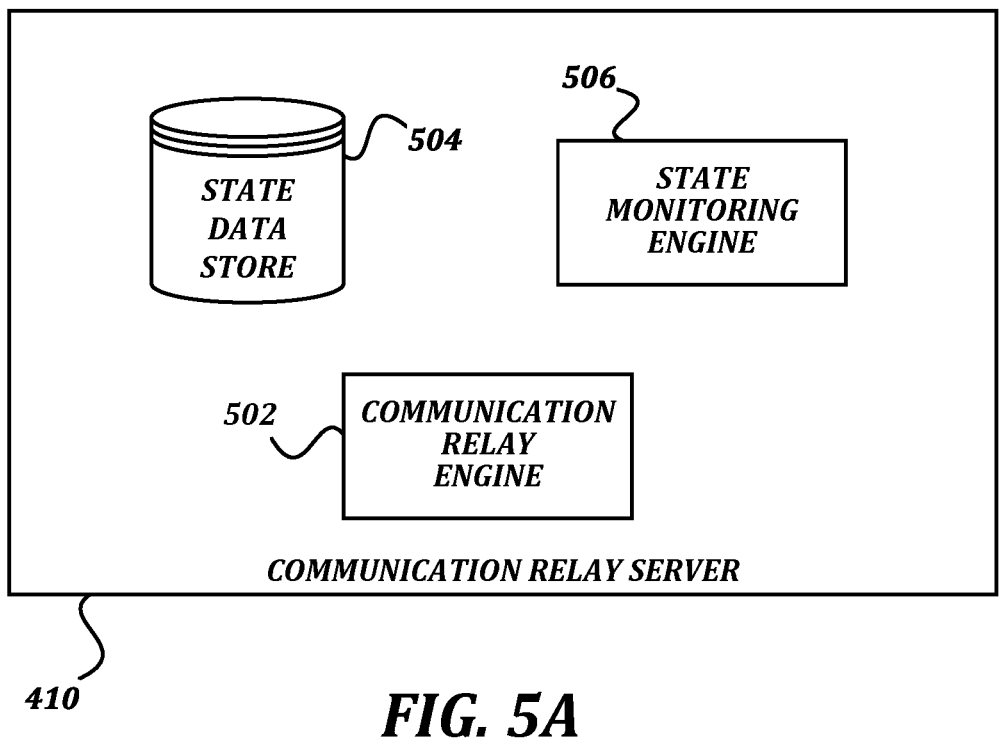
FIG. 5A is a block diagram that illustrates an example embodiment of a communication relay server according to various aspects of the present disclosure.

FIG. 5A is a block diagram that illustrates an example embodiment of a communication relay server according to various aspects of the present disclosure. Typically, bandwidth available to endpoint systems may be asymmetric. That is, a bandwidth available for upload may be significantly less than a bandwidth available for download. While this may not present a significant problem when a first endpoint system 402 and a second endpoint system 404 are the only endpoint systems, the problem arises as additional endpoint systems are added. If notifications were transmitted directly between endpoint systems (instead of via the communication relay server 410), a transmitting endpoint system would have to send an additional notification for each new endpoint system taking part in the shared virtual environment. Hence, as the number of objects for which notifications are transmitted from a first endpoint system 402 and the number of other endpoints both increase, the number of notifications that have to be transmitted by the first endpoint system 402 increases exponentially. This is likely to rapidly consume the available upload bandwidth. To solve this problem, the first endpoint system 402 can send a single notification to the communication relay server 410, and the communication relay server 410 sends it to the other endpoint systems. This helps conserve the limited upload bandwidth available to the first endpoint system 402. Further details of how this transmission may take place are provided below in FIG. 9 and the accompanying text.

In the illustrated embodiment, the communication relay server 410 includes a state monitoring engine 506, a communication relay engine 502, and a state data store 504.

In general, the word "engine," as used herein, refers to logic embodied in hardware and/or software instructions, which can be written in a programming language, such as C, C++, C#, COBOL, JAVA™, PHP, Perl, HTML, CSS, JavaScript, VBScript, ASPX, Microsoft .NET™, and/or the like. An engine may be compiled into executable programs or written in interpreted programming languages. Engines may be callable from other engines or from themselves. Generally, the engines described herein refer to logical components that can be merged with other engines, or can be divided into sub-engines. The engines can be stored in any type of computer-readable medium or computer storage device and be stored on and executed by one or more general purpose computers, thus creating a special purpose computer configured to provide the engine.

As understood by one of ordinary skill in the art, a "data store" as described herein may be any suitable device configured to store data for access by a computing device. One example of a data store is a key-value store. However, any other suitable storage technique and/or device capable of organizing and storing the data may be used, such as a relational database management system (RDBMS), an object database, and/or the like. Other examples of a data store may also include data stored in an organized manner on a computer-readable storage medium, as described further below.

One example of a data store which includes reliable storage, but also low overhead, is a file system or database management system that stores data in files (or records) on a computer-readable medium such as flash memory, random access memory (RAM), hard disk drives, and/or the like. Such a data store may be likely to be used locally by the endpoint computing device 602. One example of a data store is a highly reliable, high-speed RDBMS or key-value store executing on one or more computing devices and accessible over a high-speed packet switched network. Such data stores may be likely to be used by the virtual environment provider system 400. One of ordinary skill in the art will recognize that separate data stores described herein may be combined into a single data store, and/or a single data store described herein may be separated into multiple data stores, without departing from the scope of the present disclosure.

In some embodiments, the communication relay engine 502 is configured to receive notifications from endpoint systems, and to re-transmit those notifications to other endpoint systems. In some embodiments, the state monitoring engine 506 is configured to manage state information held within the state data store 504. In some embodiments, the state monitoring engine 506 may review the notifications received by the communication relay engine 502, and may store information from the notifications in the state data store 504. In some embodiments, the state monitoring engine 506 may ignore information that is ephemeral (including but not limited to location information from location change notifications associated with moving objects), because it will change too quickly to be usefully stored. In some embodiments, the state monitoring engine 506 may wait to store location information in the state data store 504 until the location change notifications indicate that a previously moving object has come to rest. In some embodiments, the state monitoring engine 506 may store information from notifications that is not ephemeral (or at least that changes on a less-frequent basis), such as whether an avatar is present in the shared virtual environment, a score for a game being played, and/or the like. Though each endpoint system should be receiving the notifications from the communication relay engine 502, storing data in the state data store 504 allows an endpoint system that joins the shared virtual environment later to receive initial status upon joining, instead of having to wait to receive notifications from the various endpoint systems to know what objects to present.

Figure 5B:
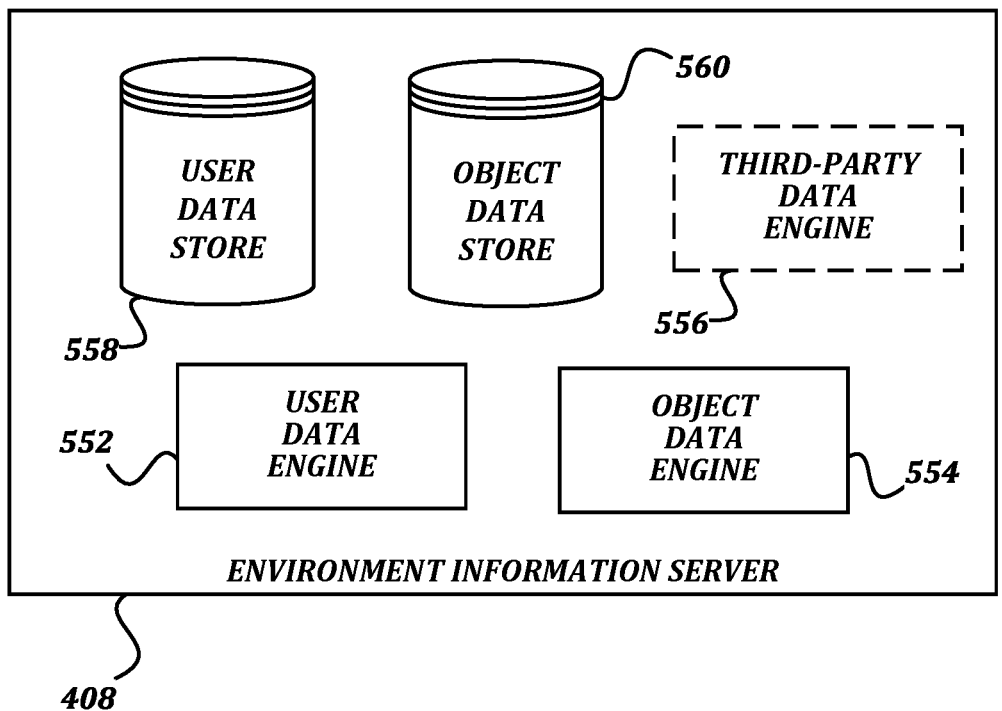
FIG. 5B is a block diagram that illustrates an example embodiment of an environment information server according to various aspects of the present disclosure.

FIG. 5B is a block diagram that illustrates an example embodiment of an environment information server according to various aspects of the present disclosure. In some embodiments, presenting the shared virtual environment will involve shared, immutable objects that can be altered by the environment provider but are otherwise static (such as walls, game logic, and/or the like). Presenting the shared virtual environment may also involve managing user settings, permissions, objects, and the like. While endpoint systems may be suitable for simulating the shared virtual environment for presentation, the intermittent connectivity of endpoint systems makes them unsuitable for managing this type of information. Accordingly, the environment information server 408 may manage and distribute such information.

In the illustrated embodiment, the environment information system 408 includes a user data engine 552, an object data engine 554, an optional third-party data engine 556, a user data store 558, and an object data store 560.

In some embodiments, the user data engine 552 is configured to manage user data within the user data store 558. Some non-limiting examples of user data include unique user identifiers, login and password information, contact information, avatar customization information, preferences, and billing information. The user data may be manipulated through interfaces in the shared virtual environment itself, or through an additional user interface (such as a web-based interface) provided by the environment information server 408.

In some embodiments, the object data engine 554 is configured to manage object data within the object data store 560. The object data may include, but is not limited to, a unique identifier of the object (or an object type); a model representing shape, mass, texture, density, and other physical attributes of the object (or object type); a default location for the object; an owner of the object; and one or more scripts defining behavior of the object.

In some embodiments, the third-party data engine 556 is configured to interact with one or more third-party data sources 412. As some non-limiting examples, the third-party data engine 556 may exchange information with a social network service to allow users within the shared virtual environment to communicate via the social network, to retrieve or upload media or other social postings, and/or for federated authentication. In some embodiments, the third-party data engine 556 may connect with a billing service in order to charge users for access to features within the shared virtual environment. In some embodiments, the third-party data engine 556 may communicate with a third-party content provider to determine whether a given user has access to particular content within the shared virtual environment, or to retrieve such content as requested by the user.

Figure 6:
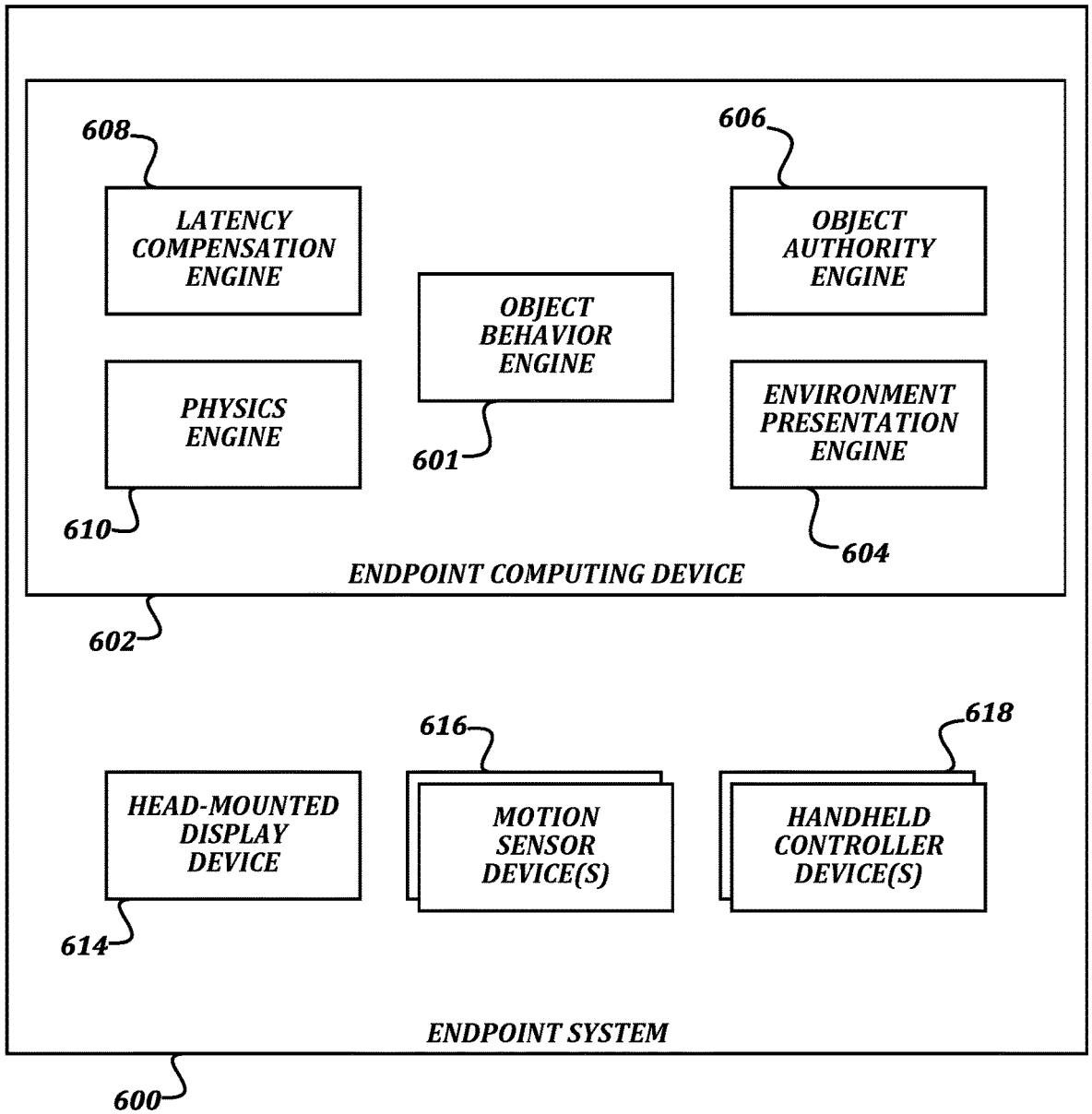
FIG. 6 is a block diagram that illustrates an example embodiment of an endpoint system according to various aspects of the present disclosure.

FIG. 6 is a block diagram that illustrates an example embodiment of an endpoint system according to various aspects of the present disclosure. In the illustrated embodiment, the endpoint system 600 includes an endpoint computing device 602, a head-mounted display device 614, one or more motion sensor devices 616, and one or more handheld controller devices 618.

In some embodiments, the endpoint computing device 602 may be a desktop computing device, a laptop computing device, a tablet computing device, a mobile computing device, or any other type of computing device capable of executing the functionality described herein. The endpoint computing device 602 may have a significant amount of computing and graphic presentation power in order to be able to both execute all of the engines and drive the presentation on the head-mounted display device 614 at a consistently high frame rate. To provide this power, the endpoint computing device 602 may have specialized processors, such as a dedicated graphics card, a physics processing unit, and/or the like.

In some embodiments, the head-mounted display device 614 includes one or more screens, and is configured to be worn on a user's head such that an immersive view of the screens is provided. The head-mounted display device 614 may also include one or more speakers (such as headphones or the like) to provide an audio presentation as well as the video presentation provided by the one or more screens. In some embodiments, the handheld controller devices 618 include one or more input devices such as buttons, trackpads, directional pads, analog sticks, capacitive sensors, and the like. In some embodiments, one of the input devices of the handheld controller devices 618 may be a trigger button. In some embodiments, the handheld controller devices 618 may detect finger states or positions without requiring buttons to be actuated. In some embodiments that are referred to as virtual reality, the head-mounted display device 614 may be opaque, and the screens are the only thing that the user sees during use. In some embodiments that are referred to as augmented reality, the head-mounted display device 614 may have a translucent or transparent display screen, and may allow the user to see objects in the real world along with the objects in the shared virtual environment.

In some embodiments, the motion sensor devices 616 independently detect motion of one or more of the head-mounted display device 614, the handheld controller devices 618, and the user. The motion sensor devices 616 may use any suitable technology to detect the motion, including but not limited to accelerometers, magnetometers, gyroscopes, infrared lasers, depth cameras, photosensors, and computer vision. In some embodiments, multiple motion sensor devices 616 may be located around a room in which the endpoint system 600 is located in order to detect the motion of the head-mounted display device 614, the handheld controller devices 618, and/or the user. In some embodiments, at least some of the motion sensor devices 616 may be incorporated into other devices (such as an accelerometer, magnetometer, and/or gyroscope integrated within the head-mounted display device 614 or handheld controller devices 618.

In some embodiments, the endpoint computing device 602 may be communicatively coupled to the head-mounted display device 614, the motion sensor devices 616, and the handheld controller devices 618 using any suitable communication technology. For example, for the connections between the endpoint computing device 602 and the head-mounted display device 614 or the motion sensor devices 616, high reliability and bandwidth may be desired, and so a suitable high-bandwidth wired communication technique (such as USB 3.0, Thunderbolt, Ethernet, and/or the like) may be used. As another example, for the connections between the endpoint computing device 602 and the handheld controller devices 618, mobility may be a greater concern than bandwidth, and so a wireless communication technique (such as Bluetooth, WiFi, radio frequency (RF) communication, and/or the like) may be used.

In some embodiments, the endpoint computing device 602 is responsible for generating the presentation of the shared virtual environment to the user, for managing the behavior of objects within the shared virtual environment as presented to the user, and for communicating state updates and other environment information with the virtual environment provider system 400 and other endpoint systems. In the illustrated embodiment, the endpoint computing device 602 is configured to provide a latency compensation engine 608, a physics engine 610, an object authority engine 606, and an environment presentation engine 604 in order to provide this functionality.

In some embodiments, the environment presentation engine 604 generates presentations of objects in the shared virtual environment to the user. In some embodiments, the environment presentation engine 604 may generate at least one video feed that includes the presentation of the objects, and provides the at least one video feed to the head-mounted display device 614 to be displayed. In some embodiments, the environment presentation engine 604 may also generate at least one audio feed to be presented via the head-mounted display device 614.

In some embodiments, the physics engine 610 provides a real-time simulation of physical behavior of the objects in the shared virtual environment. As known to one of ordinary skill in the art, a physics engine 610 may provide the simulation by conducting collision detection/collision response actions, rigid body and/or soft body dynamics, fluid dynamics, and/or other processing to determine how objects would interact within the shared virtual environment. In some embodiments, the physics engine 610 may be implemented in software executing on a CPU of the endpoint computing device 602, in software executing in a hardware-accelerated manner on a graphics processing unit (GPU), in dedicated hardware such as a physics processing unit (PPU), or in any combination thereof. Some nonlimiting examples of physics engines 610 that may be suitable for use with the endpoint system 600 include the PhysX engine by Nvidia, the Havok engine by Microsoft Corporation, and the open source Bullet engine.

In some embodiments, the object behavior engine 601 may determine non-physical behavior of objects within the shared virtual environment. As some non-limiting examples of non-physical behavior, the object behavior engine 601 may determine permissions for interacting with an object, may change object states based on game rules or logic, and may detect meaning embedded in interactions detected by the physics engine 610 and respond accordingly (e.g., providing logic that detects collaborative gestures based on object collisions; determining that a collision between a first object and a second object, such as a Frisbee and a target, indicates that a goal in a game has been achieved, and so on).

As described elsewhere herein, object authority over objects within the shared virtual environment is held by the various endpoint systems. Accordingly, the endpoint system 600 will receive location change notifications from other endpoint systems indicating how objects for which the endpoint system 600 does not have object authority should move. The transmission of these notifications will naturally be delayed by some latency in the network 90. In some embodiments, the latency compensation engine 608 is configured help compensate for this latency so that the presentation of objects by the endpoint system 600 can be substantially synchronized with the presentation of the same objects by other endpoint systems 600. In some embodiments, the latency compensation engine 608 is configured to measure latency between the endpoint system 600 and an endpoint system that transmitted a location change notification. While the physics engine 610 may be used to simulate motion of the object to the location indicated in the location change notification, the latency compensation engine 608 helps determine how stale the transmitted location is, and provides information to the physics engine 610 (or the environment presentation engine 604 to allow the animation of the object motion by the endpoint system 600 to eventually be synchronized with the authoritative object motion at the authoritative endpoint system. The latency compensation engine 608 may also help the endpoint computing device 602 compensate for lost or missed location change notifications. Detailed description of these techniques is provided below.

Because the endpoint system 600 manages object authority for objects within the shared virtual environment, in some embodiments, the object authority engine 606 is provided to do so. In some embodiments, the object authority engine 606 is configured to transmit notifications in order to take over object authority for a given object within the shared virtual environment. In some embodiments, the object authority engine 606 is configured to transmit location change notifications based on the locations generated by the physics engine 610 or the object behavior engine 601 for objects for which the endpoint system 600 has taken over object authority.

As described herein, the engines of the endpoint computing device 602 manage the shared virtual environment using a model-view-controller paradigm. That is, for any given object within the shared virtual environment, a data structure representing a model of the object is maintained by the endpoint computing device 602. The latency compensation engine 608, physics engine 610, object behavior engine 601, and object authority engine 606 make changes to the model of the object and therefore act as controllers. The environment presentation engine 604 generates a presentation based on the model of the object, and therefore acts as a view. In some embodiments, other software design paradigms may be used, and so the functionality described below may be split differently, or may be performed by different engines. In some embodiments, the engines described herein may be combined with each other. In some embodiments, multiple copies of a single engine may be present. In some embodiments, functionality described as originating from a given engine may in other embodiments be performed by a different engine.

In some embodiments, some of the devices illustrated in FIG. 6 may be combined with other devices, or some components may be in different devices than illustrated in FIG. 6. For example, in some embodiments, the physics engine 610 and/or the environment presentation engine 604 may be provided by dedicated devices separate from the endpoint computing device 602, or may be provided by the head-mounted display device 614. In some embodiments, the motion sensor devices 616 may track the hands of the user accurately enough to allow the handheld controller devices 618 to be omitted. The below description will refer to embodiments that use handheld controller devices 618 for the sake of clarity. However, the description should not be seen as limiting the disclosure this embodiment, and should instead be seen as encompassing embodiments wherein the handheld controller devices 618 are missing and corresponding user input is obtained through the motion sensor devices 616 alone.

In some embodiments, commercially available hardware may be used for the head-mounted display device 614, the motion sensor devices 616, and the handheld controller devices 618. Some nonlimiting examples of such hardware include the Rift headset and Touch controllers from Oculus VR, LLC; the HTC Vive headset and SteamVR controllers from HTC and Valve Corporation; and the HoloLens headset from Microsoft Corporation. While these examples are provided, one of ordinary skill in the art will understand that the examples are not intended to be limiting, but that other hardware from other manufacturers may instead be used in some embodiments of the present disclosure.

Figure 7:
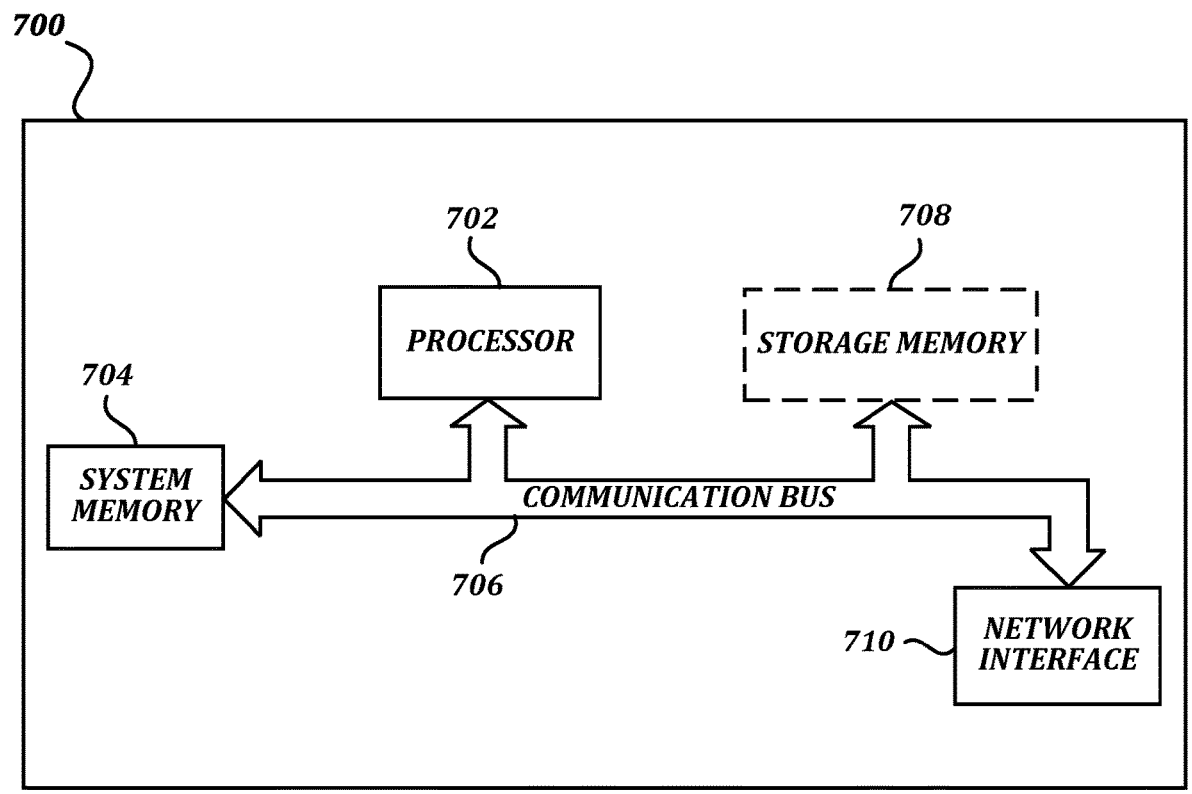
FIG. 7 is a block diagram that illustrates aspects of an exemplary computing device appropriate for use with embodiments of the present disclosure.

FIG. 7 is a block diagram that illustrates aspects of an exemplary computing device 700 appropriate for use with embodiments of the present disclosure. While FIG. 7 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 700 may be any one of any number of currently available or yet to be developed devices.

In its most basic configuration, the computing device 700 includes at least one processor 702 and a system memory 704 connected by a communication bus 706. Depending on the exact configuration and type of device, the system memory 704 may be volatile or nonvolatile memory, such as read only memory ("ROM"), random access memory ("RAM"), EEPROM, flash memory, or similar memory technology. Those of ordinary skill in the art and others will recognize that system memory 704 typically stores data and/or program modules that are immediately accessible to and/or currently being operated on by the processor 702. In this regard, the processor 702 may serve as a computational center of the computing device 700 by supporting the execution of instructions.

As further illustrated in FIG. 7, the computing device 700 may include a network interface 710 comprising one or more components for communicating with other devices over a network. Embodiments of the present disclosure may access basic services that utilize the network interface 710 to perform communications using common network protocols. The network interface 710 may also include a wireless network interface configured to communicate via one or more wireless communication protocols, such as WiFi, 2G, 3G, LTE, WiMAX, Bluetooth, and/or the like.

In the exemplary embodiment depicted in FIG. 7, the computing device 700 also includes a storage medium 708. However, services may be accessed using a computing device that does not include means for persisting data to a local storage medium. Therefore, the storage medium 708 depicted in FIG. 7 is represented with a dashed line to indicate that the storage medium 708 is optional. In any event, the storage medium 708 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer-readable instructions, data structures, program modules, or other data. In this regard, the system memory 704 and storage medium 708 depicted in FIG. 7 are merely examples of computer-readable media.

Suitable implementations of computing devices that include a processor 702, system memory 704, communication bus 706, storage medium 708, and network interface 710 are known and commercially available. For ease of illustration and because it is not important for an understanding of the claimed subject matter, FIG. 7 does not show some of the typical components of many computing devices. In this regard, the computing device 700 may include input devices, such as a keyboard, keypad, mouse, microphone, touch input device, touch screen, tablet, and/or the like. Such input devices may be coupled to the computing device 700 by wired or wireless connections including RF, infrared, serial, parallel, Bluetooth, USB, or other suitable connections protocols using wireless or physical connections. Similarly, the computing device 700 may also include output devices such as a display, speakers, printer, etc. Since these devices are well known in the art, they are not illustrated or described further herein. Unless specifically defined herein, all terms used herein have the same meaning as they would to one skilled in the art of the present disclosure.

Figure 8A:
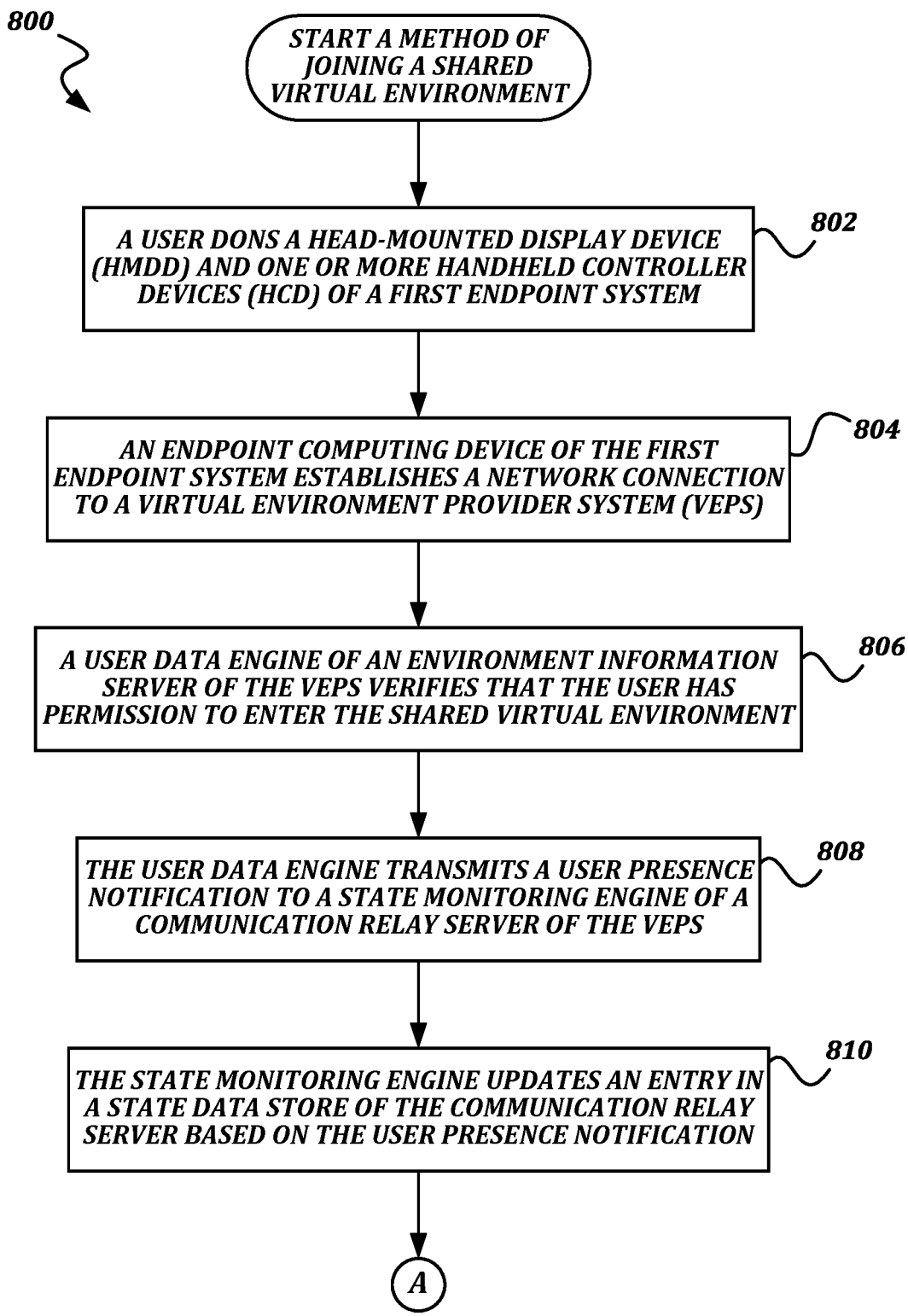
FIGS. 8A-8B are a flowchart that illustrates an example embodiment of a method of joining a shared virtual environment according to various aspects of the present disclosure.
Figure 8B:
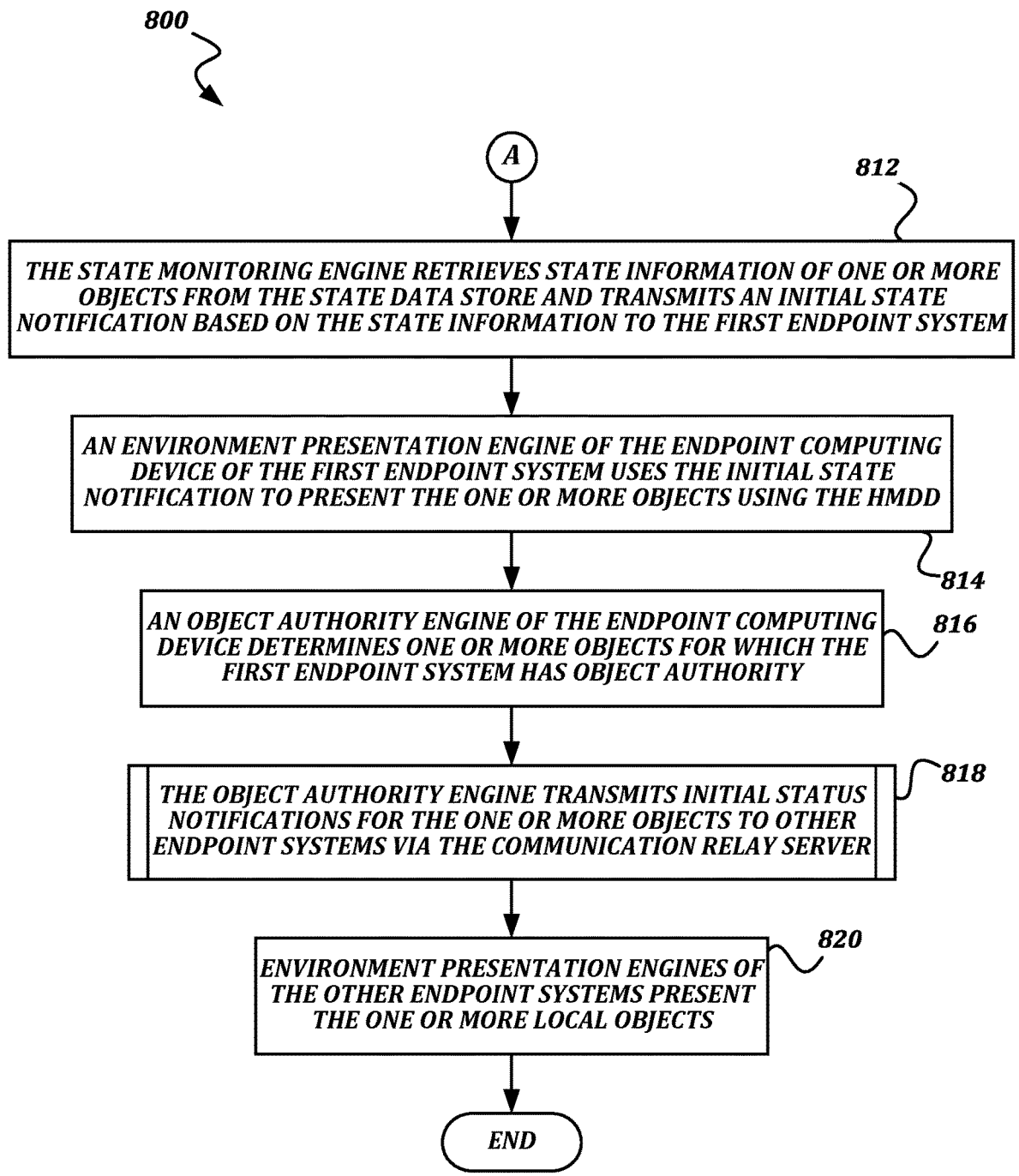

FIGS. 8A-8B are a flowchart that illustrates an example embodiment of a method of joining a shared virtual environment according to various aspects of the present disclosure. From a start block, the method 800 proceeds to block 802, where a user dons a head-mounted display device (HMDD) 614 and one or more handheld controller devices (HCD) 618 of a first endpoint system 402. At block 804, an endpoint computing device 602 of the first endpoint system 402 establishes a network connection to a virtual environment provider system (VEPS) 400. In some embodiments, establishing the network connection to the virtual environment provider system 400 may include a clock synchronization handshake, an exchange of user credentials, an exchange of encryption keys, and/or transmission of other information for establishing the connection. Next, at block 806, a user data engine 552 of an environment information server 408 of the virtual environment provider system 400 verifies that the user has permission to enter the shared virtual environment. In some embodiments, the user data engine 552 may check user credentials submitted in block 804 against an entry in the user data store 558 in order to verify permission. In some embodiments, permission may also be conditioned on aspects of the network connection itself, such as having at least a minimum amount of bandwidth and/or having no more than a maximum allowable latency.

Once permission is verified, the method 800 proceeds to block 808, where the user data engine 552 transmits a user presence notification to a state monitoring engine 506 of a communication relay server 410 of the virtual environment provider system 400. At block 810, the state monitoring engine 506 updates an entry in a state data store 504 of the communication relay server 410 based on the user presence notification. In some embodiments, storing information from the user presence notification in the state data store 504 allows the communication relay server 410 to quickly inform newly connecting endpoint systems 600 about which other endpoint systems 600 are currently participating in the shared virtual environment. The entry may include a network address (such as an IP address and/or the like) by which notifications can be sent to the first endpoint system 402.

The method 800 then proceeds to a continuation terminal ("terminal A"). From terminal A (FIG. 8B), the method 800 proceeds to block 812, where the state monitoring engine 506 retrieves state information of one or more objects from the state data store 504 and transmits an initial state notification based on the state information to the first endpoint system 402. The initial state notification may include the last stored location, velocity, and/or other aspects of the objects. At block 814, an environment presentation engine 604 of the first endpoint system 402 uses the initial state notification to present the one or more objects using the head-mounted display device 614. The initial state notification allows the environment presentation engine 604 of the first endpoint system 402 to know where the objects should be presented within the shared virtual environment. In some embodiments, the initial state notification may include object identifiers for the objects, and the first endpoint system 402 may retrieve models, textures, logic, or other detailed information about the objects from the object data engine 554 of the environment information server 408. In some embodiments, the initial state notification may include the models, textures, logic, or other detailed information about the objects. In some embodiments, the detailed information about the objects may already be present on the first endpoint system 402, and an object identifier in the initial state notification is enough for the first endpoint system 402 to understand how to present the object.

Figure 9:
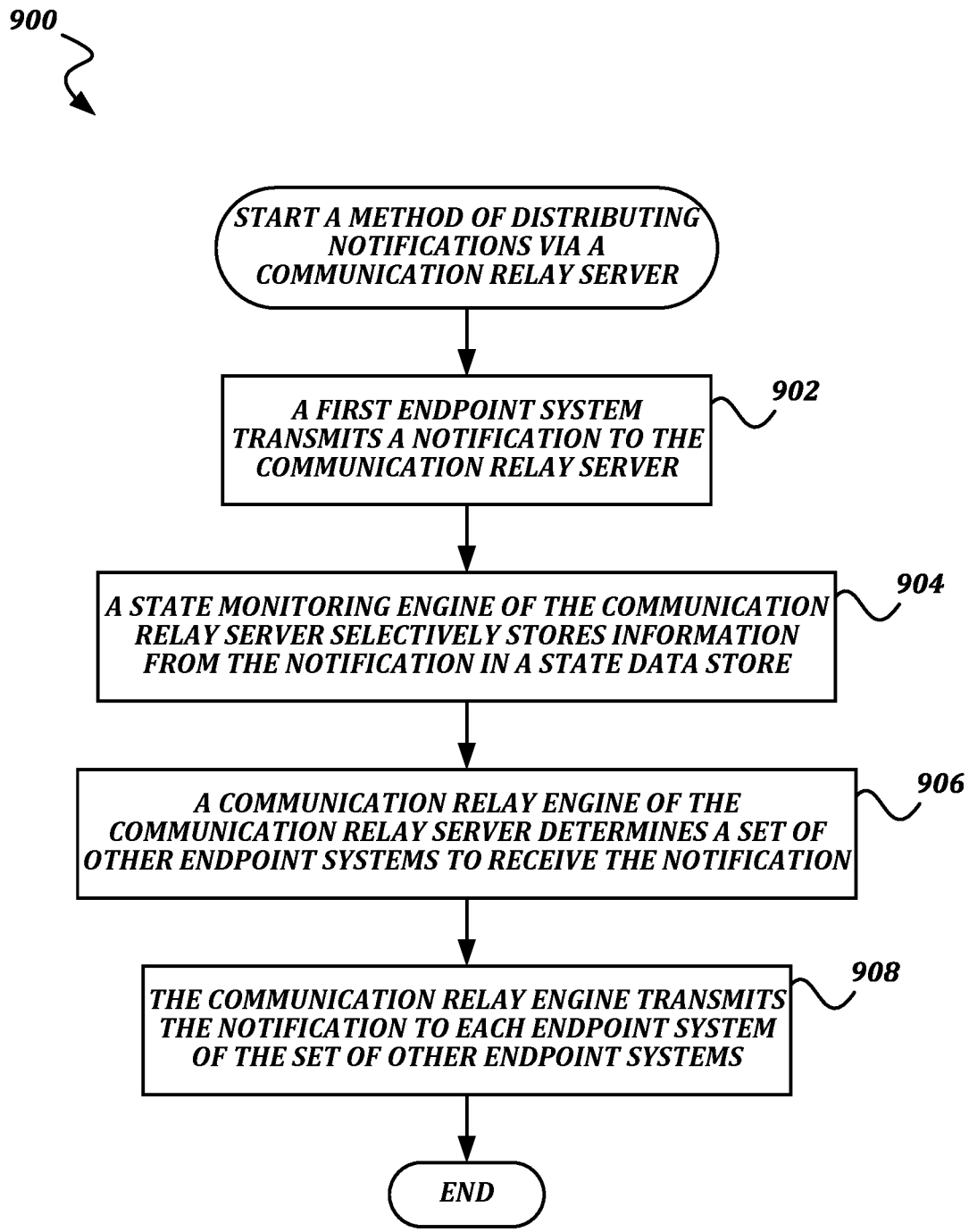
FIG. 9 is a flowchart that illustrates an example embodiment of a method of distributing notifications via a communication relay server according to various aspects of the present disclosure.

At block 816, an object authority engine 606 of the endpoint computing device 602 determines one or more objects for which the first endpoint system 402 has object authority. The objects for which the first endpoint system 402 has object authority include at least objects associated with movement of an avatar associated with the first endpoint system 402. For example, in some embodiments, the first endpoint system 402 may initially have object authority over a head object and two hand objects that are associated with the avatar. In some embodiments, the first endpoint system 402 may also initially have object authority over other objects from the initial state notification that are positioned close to the avatar. The method 800 then proceeds to procedure block 818, where the object authority engine 606 transmits initial status notifications for the one or more objects to other endpoint systems via the communication relay server 410. Any suitable technique for transmitting the notifications via the communication relay server 410 may be used. An example method suitable for use in procedure block 818 is illustrated in FIG. 9 and described in the accompanying text. At block 820, environment presentation engines 604 of the other endpoint systems 600 present the one or more local objects. The presentations on the other endpoint systems 600 use the initial status notifications to determine where to present the objects. The method 800 then proceeds to an end block and terminates. Once the method 800 has concluded, the user of the first endpoint system 402 has entered the shared virtual environment. The first endpoint system 402 will continue to present the shared virtual environment after the method 800 completes.

FIG. 9 is a flowchart that illustrates an example embodiment of a method of distributing notifications via a communication relay server according to various aspects of the present disclosure. As stated above, the method 900 is suitable for use in procedure block 818, as well as in other appropriate procedure blocks throughout the present disclosure. The method 900 may be used to reduce bandwidth requirements, particularly on asymmetric connections at the endpoint systems where upload bandwidth is more limited than download bandwidth.

From a start block, the method 900 proceeds to block 902, where a first endpoint system 402 transmits a notification to the communication relay server 410. Next, at block 904, a state monitoring engine 506 of the communication relay server 410 selectively stores information from the notification in a state data store 504. In some embodiments, the state monitoring engine 506 only stores information from notifications that are not merely ephemeral. For example, the state monitoring engine 506 may not store information from location change notifications, because the information is likely to change very quickly, and the overhead of storing the information in the state data store 504 would not be worth it. However, if the state monitoring engine 506 determines that a location change notification indicates that an object has come to rest (for example, the location information in two or more consecutive location change notifications is identical, or the velocity in a location change notification is zero), the state monitoring engine 506 may store such information in the state data store 504 because it is not likely to change soon. This may also be useful because if a new endpoint system joins the shared virtual environment after the object has come to rest, the new endpoint system would have no other way of knowing the location of the object unless the state monitoring engine stores the location in the state data store 504 and provides it with the initial state notification, because the new endpoint system would not have received any of the past location change notifications. As another example, the state monitoring engine 506 may store other information that is not as ephemeral as location, including but not limited to grab status, game scores, game event notifications, and/or the like.

At block 906, a communication relay engine 502 of the communication relay server 410 determines a set of other endpoint systems to receive the notification. In some embodiments, the communication relay engine 502 may determine which other endpoint systems are participating in the shared virtual environment by checking the entries in the state data store 504, and may use the entries to determine network addresses at which the other endpoint systems can receive communication. Next, at block 908, the communication relay engine 502 transmits the notification to each endpoint system of the set of other endpoint systems. The transmission may use the network addresses that were retrieved from the entry in the state data store 504. The method 900 then proceeds to an end block and terminates.

In the method 900, any suitable transmission technique may be used for the notifications in blocks 902 and 908. In some embodiments, the notifications may be transmitted using a connectionless transmission technique that is appropriate for time-sensitive applications. One suitable technique is the use of user datagram protocol (UDP) packets, though other techniques could be used. The description above of method 900 refers to a "first endpoint system" for clarity. One of ordinary skill in the art will recognize that this method 900 could be used by any endpoint system described herein.

Figure 10A:
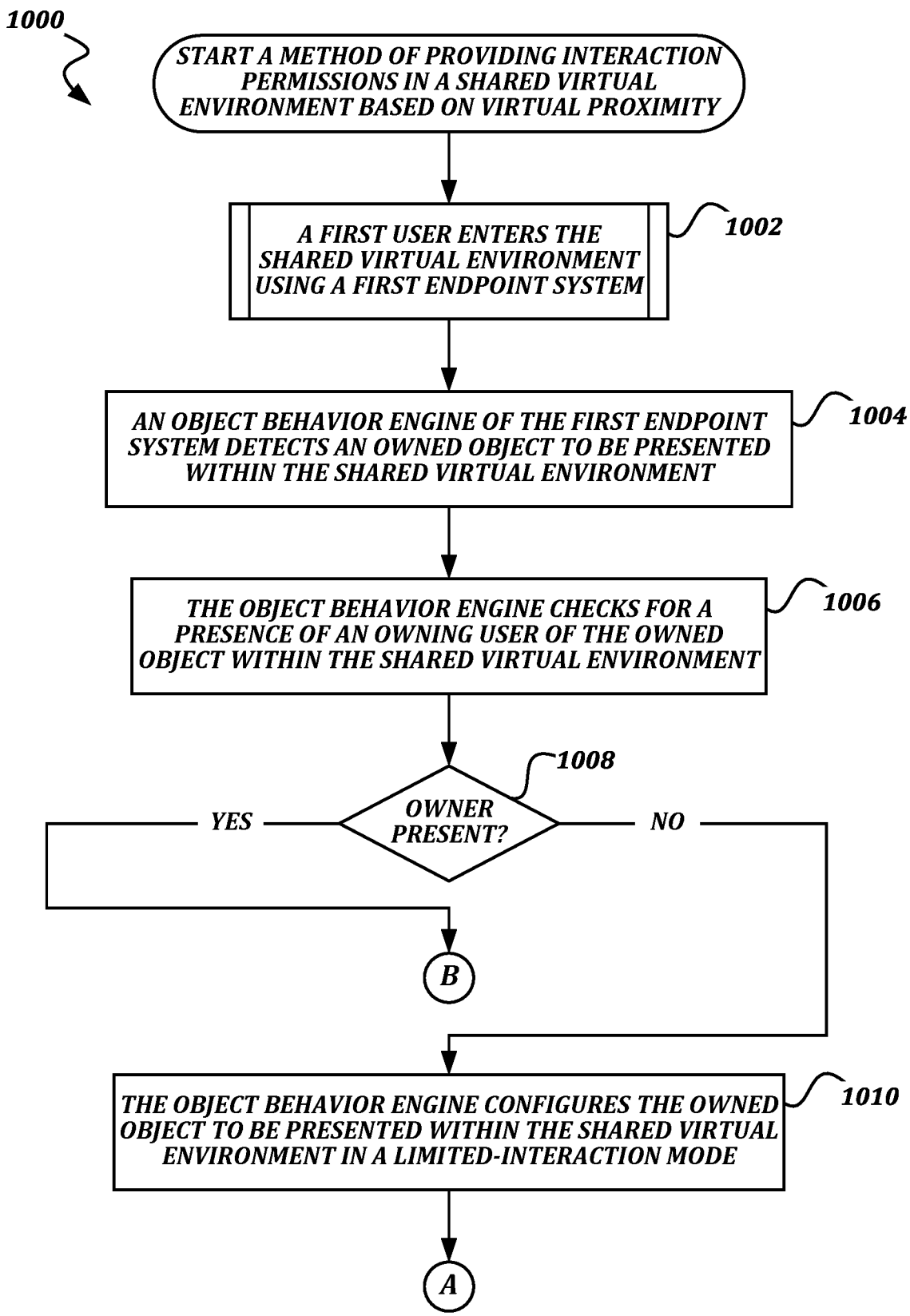
FIGS. 10A-10C are a flowchart that illustrates an example embodiment of a method of providing interaction permissions in a shared virtual environment based on virtual proximity according to various aspects of the present disclosure.
Figure 10B:
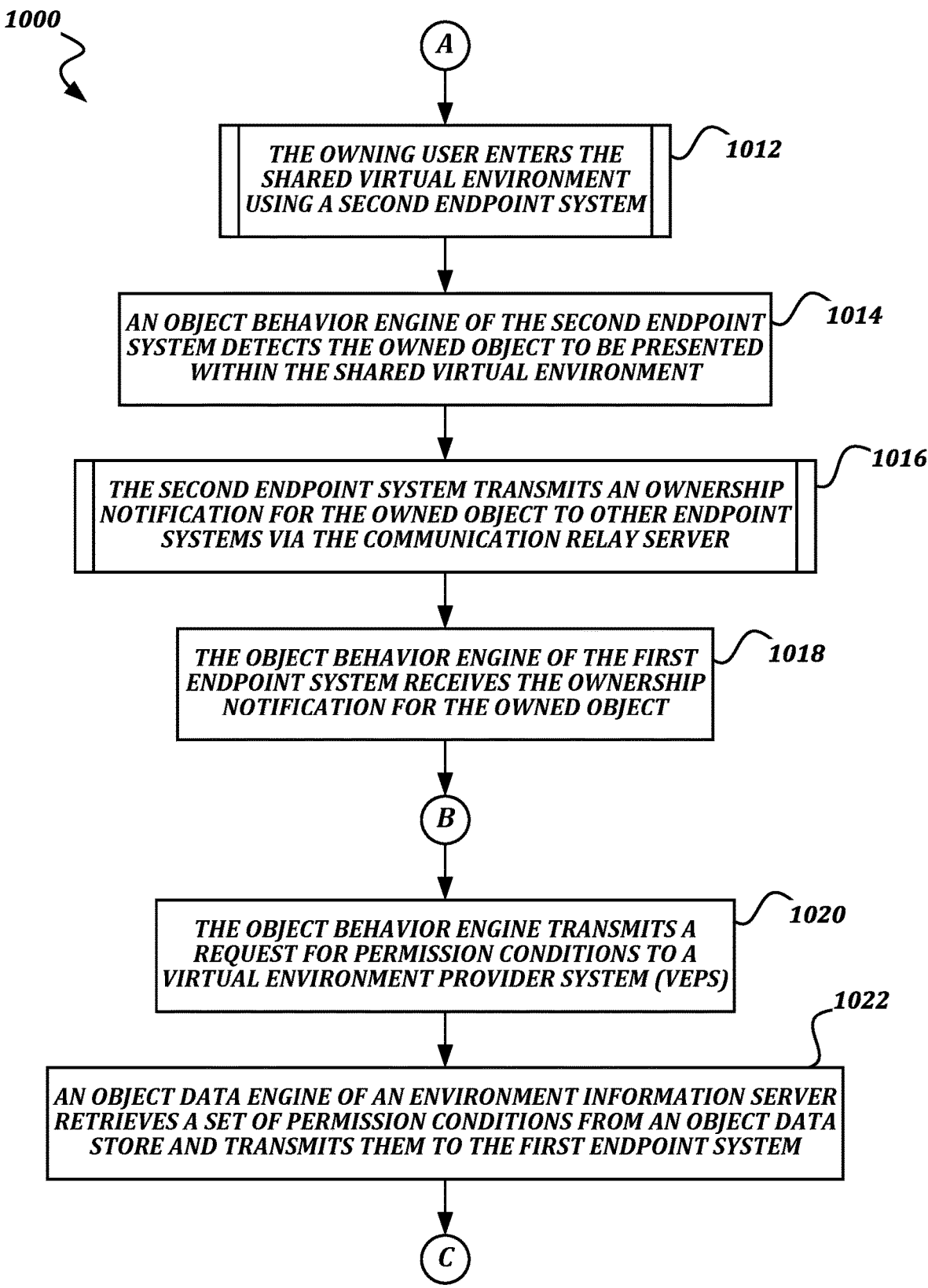
Figure 10C:
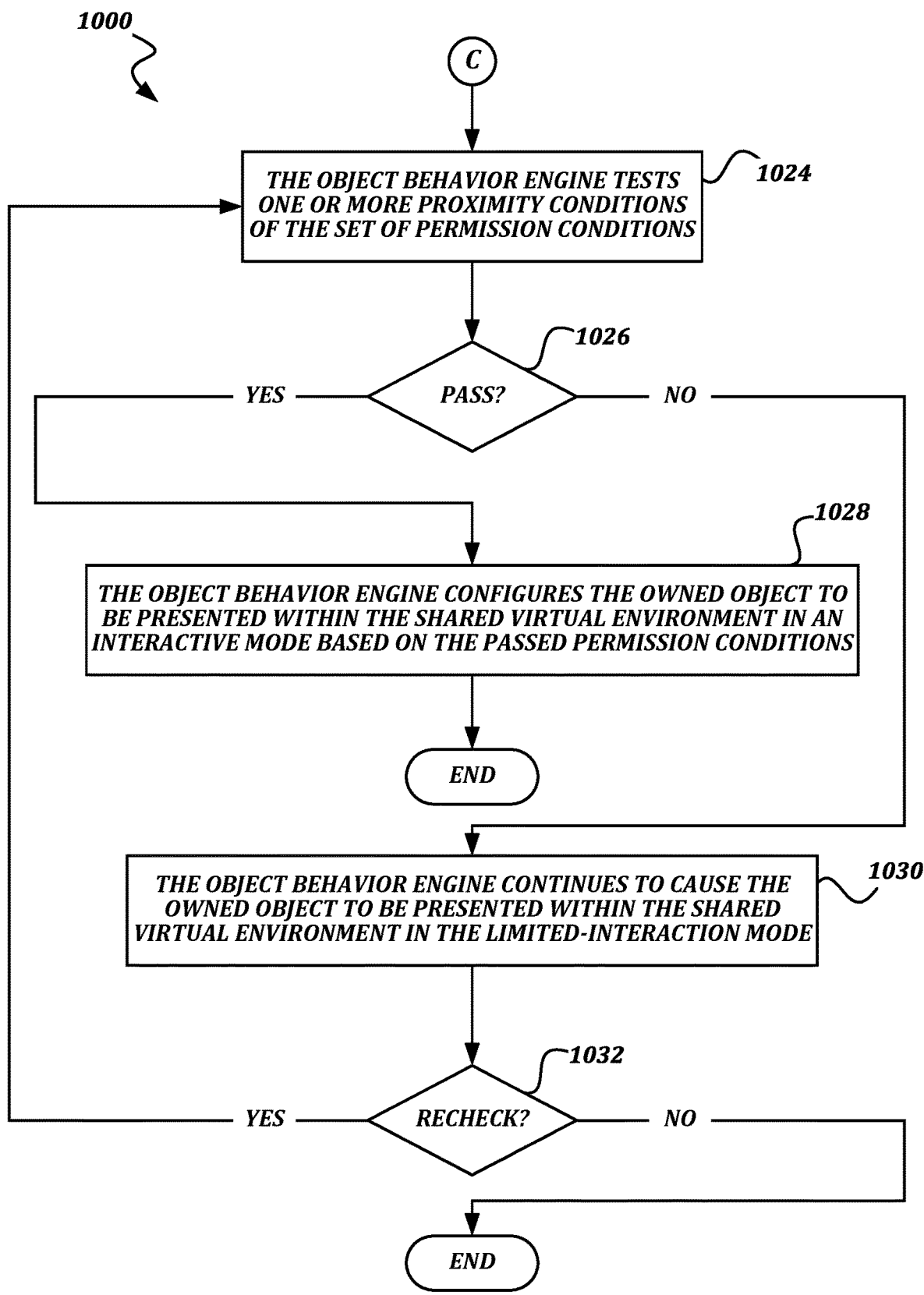

FIGS. 10A-10C are a flowchart that illustrates an example embodiment of a method of providing interaction permissions in a shared virtual environment based on virtual proximity according to various aspects of the present disclosure. From a start block, the method 1000 proceeds to a procedure block 1002, where a first user enters the shared virtual environment 300 using a first endpoint system 302. Any suitable method for entering the shared virtual environment 300 may be used, including but not limited to the method 800 illustrated in FIGS. 8A-8B and described above.

At block 1004, an object behavior engine 601 of the first endpoint system 302 detects an owned object 314 to be presented within the shared virtual environment 300. In some embodiments, object data for the owned object 314 retrieved at block 812 of the method 800 executed at procedure block 1002 could indicate that the object is an owned object and/or an owner of the object. In some embodiments, the owned object 314 may be detected later, such as when the first avatar 308 is navigated to a place within the shared virtual environment 300 where the owned object 314 would be presented (e.g., would be visible within a view presented by the head-mounted display device 614).

Next, at block 1006, the object behavior engine 601 checks for a presence of an owning user of the owned object 314 within the shared virtual environment 300. In some embodiments, the object behavior engine 601 may check state information held by the first endpoint system 302 in order to determine whether the presence of an avatar associated with the owning user was reported in the initial state notification received upon joining the shared virtual environment 300. In some embodiments, the object behavior engine 601 may determine a unique identifier of the owning user or of the avatar of the owned user, and could query the state monitoring engine 506 of the communication relay server 410 or the object data engine 554 of the environment information server 408 to request the state and/or location of the avatar.

The method 1000 then proceeds to a decision block 1008, where a determination is made based on whether the owning user was determined to be present within the shared virtual environment 300. If the owning user was determined to be present, then the result of decision block 1008 is YES, and the method 1000 proceeds to a continuation terminal ("terminal B"). Otherwise, the result of decision lock 1008 is NO, and the method 1000 proceeds to block 1010, where the object behavior engine 601 configures the owned object 314 to be presented within the shared virtual environment in a limited-interaction mode. As described further below, more detailed processing may be performed if the owning user is present to determine whether an interactive mode should be used, but if the owning user is not present (as at block 1010), then skipping straight to presenting the limited-interaction mode is appropriate.

In some embodiments, the limited-interaction mode may allow the owned object 314 to be viewed by the user of the first endpoint system 302, but would ignore attempts of the user of the first endpoint system 302 to move, edit, or otherwise interact with the owned object 314. In some embodiments, the constraints of the limited-interaction mode may be enforced by the environment presentation engine 604, the object behavior engine 601, and/or the physics engine 610. For example, if the limited-interaction mode does not include "move" rights, then the physics engine 610 may ignore simulated forces applied to the owned object 614 by objects under the control of the first endpoint system 302. In some embodiments, a level of interaction allowed with the owned object 314 in the limited-interaction mode may be specified in the object data. For example, the object data may indicate that the limited-interaction mode includes the ability to collide with the owned object 314, but not to change its position. As another example, the object data may indicate that the limited-interaction mode may include the ability to move the owned object 314, but not to break apart sub-objects which constitute the owned object 314 (e.g., a toy made of building blocks may be moved around or played with, but may not be taken apart).

The method 1000 then proceeds to a continuation terminal ("terminal A"). From terminal A (FIG. 10B), the method 1000 advances to procedure block 1012, where the owning user enters the shared virtual environment 300 using a second endpoint system 304. Again, any suitable method, including but not limited to the method 800 illustrated in FIGS. 8A-8B and described above, may be used by the owning user to enter the shared virtual environment 300. Next, at block 1014, an object behavior engine 601 of the second endpoint system 304 detects the owned object 314 to be presented within the shared virtual environment 300. As noted above, in some embodiments, the object behavior engine 601 may detect the owned object 314 using the initial state notification received at block 812, or may receive the information that allows the detection at a later time. The method 1000 then proceeds to a procedure block 1016, where the second endpoint system 304 transmits an ownership notification for the owned object to other endpoint systems via the communication relay server. Any suitable technique for transmitting the notifications via the communication relay server 410, including but not limited to the method illustrated in FIG. 9, may be used.

At block 1018, the object behavior engine 601 of the first endpoint system 302 receives the ownership notification for the owned object 314. The method 1000 then proceeds to terminal B. Once the method 1000 has reached terminal B, the first endpoint system 302 has determined that the owning user is present in the shared virtual environment 300, and the first endpoint system 302 determine whether it can share the permissions of the owning user. Accordingly, from terminal B, the method 1000 proceeds to block 1020, where the object behavior engine 601 transmits a request for permission conditions to a virtual environment provider system (VEPS) 400. In some embodiments, the request for permission conditions may include a unique identifier of the owned object 314 obtained from the object data. In some embodiments, the request for permission conditions may include a unique identifier of an owning user or an avatar of the owning user, though in some embodiments this information could be retrieved by the virtual environment provider system 400 using the unique identifier of the owned object 314.

At block 1022, an object data engine 554 of an environment information server 408 retrieves a set of permission conditions from an object data store 560 and transmits them to the first endpoint system 302. In some embodiments, a permission condition includes a proximity condition. The proximity condition is a threshold of a virtual distance between two objects in the shared virtual environment 300 that should be satisfied for the proximity condition to be met. For example, a proximity condition may indicate that a virtual distance between the owned object 314 and the avatar of the owning user 310 within the shared virtual environment 300 should be less than a threshold virtual distance. As another example, a proximity condition may indicate that a virtual distance between the avatar of the owning user 310 and the avatar of the first user 308 within the shared virtual environment 300 should be less than a threshold virtual distance. As yet another example, a proximity condition may indicate that a virtual distance between at least one other avatar (other than the avatar of the first user 308 and the avatar of the owning user 310) and the owned object 314 within the shared virtual environment 300 should be less than a threshold virtual distance.

In some embodiments, a permission condition may also include a permission to be applied if the proximity condition is met. For example, a first permission condition may indicate that a user should be granted permission to move the owned object 314 if the proximity condition is met. As another example, a second permission condition may indicate that a user should be granted permission to move the owned object 314 and to edit characteristics of the owned object 314 if the proximity condition is met.

In some embodiments, a permission condition may include non-proximity conditions that should also be met. For example, in some embodiments, the user data store 558 may store social relationships between users of the system, such as friends lists, contact lists, groups, and/or the like. In such an embodiment, a permission condition may include a condition that, in order to receive interactive permissions, a user should be on the friends list of the owning user in addition to any proximity conditions in order for the permission condition to allow interactive presentation.

The method 1000 then proceeds to a continuation terminal ("terminal C"). From terminal C (FIG. 10C), the method 1000 proceeds to block 1024, where the object behavior engine 601 tests one or more proximity conditions of the set of permission conditions. The method 1000 then proceeds to a decision block 1026, where a determination is made based on whether any proximity conditions from the set of permission conditions have passed. If any of the proximity conditions were satisfied, then the result of decision block 1026 is YES, and the method 1000 proceeds to block 1028, where the object behavior engine 601 configures the owned object 314 to be presented within the shared virtual environment 300 in an interactive mode based on the passed permission conditions. In some embodiments, the interactive mode allows a greater level of interactivity than the limited-interaction mode described above. As some non-limiting examples, the interactive mode may allow for the owned object 314 to be moved, for sub-components of the owned object 314 to be manipulated, for attributes of the owned object 314 to be edited, or for sub-components of the owned object 314 to be disassembled. In some embodiments, entering the interactive mode may cause the object behavior engine 601 to receive a decryption key from the virtual environment provider system 400 that can be used to decrypt an encrypted portion of the object data for presentation or execution.

In some embodiments, all of the proximity conditions of the set of permission conditions may be evaluated, and if more than one is satisfied, the object behavior engine 601 may deterministically select a permission condition to be applied. For example, in some embodiments the object behavior engine 601 may apply the most lenient permissions for which the proximity condition is satisfied. As another example, in some embodiments the object behavior engine 601 may apply the most restrictive permissions for which the proximity condition is satisfied.

The method 1000 then proceeds to an end block and terminates. In some embodiments, instead of proceeding to the end block, the method 1000 may instead continue to ensure that the proximity conditions are met, and may therefore return to block 1008 periodically. In some embodiments that do provide continued monitoring that proximity conditions remain met, the method 1000 may apply hysteresis such that permissions will not be revoked until the proximity condition is broken for at least a threshold amount of time (or has explicitly indicated an intent to not return), so that transient disconnections or other momentary departures from proximity will not impact usability.

Returning to decision block 1026, if none of the proximity conditions were satisfied, then the result of decision block 1026 is NO, and the method 1000 proceeds to block 1030, where the object behavior engine 601 continues to cause the owned object 314 to be presented within the shared virtual environment 300 in the limited-interaction mode. In some embodiments, this may simply be implemented by the object behavior engine 601 leaving the previous permission state of the owned object 314 intact, with the environment presentation engine 604 continuing to present the owned object 314 accordingly.

The method 1000 then proceeds to a decision block 1032, where a determination is made regarding whether the set of permission conditions should be rechecked. In some embodiments, the determination may cause rechecking periodically according to a configurable period. In some embodiments, the determination may cause rechecking upon later receipt of an ownership notification. If it is determined that the set of permission conditions should be rechecked, then the result of decision block 1032 is YES, and the method 1000 returns to block 1024. Otherwise, the result of decision block 1032 is NO, and the method 1000 proceeds to an end block and terminates.

One of skill in the art will recognize that, in the description above, like names refer to like elements, even if numbering is different. For example, the first endpoint system 302, the second endpoint system 304, and the third endpoint system 306 illustrated in FIGS. 3A and 3B are all examples of an endpoint system 600 as illustrated in FIG. 6. Likewise, the endpoint systems in FIG. 4 are also examples of an endpoint system 600.

While illustrative embodiments have been illustrated and described, it will be appreciated that various changes can be made therein without departing from the spirit and scope of the invention.

The embodiments of the invention in which an exclusive property or privilege is claimed are defined as follows:

1. An endpoint system, comprising:
   a display device;
   at least one processor; and
   a non-transitory computer-readable medium having computer-executable instructions stored thereon that, in response to execution by the at least one processor, cause the endpoint system to perform actions for controlling access to an object within a shared virtual environment, the actions comprising:
   receiving, by the endpoint system, object data indicating an owned object to be presented within the shared virtual environment;
   determining, by the endpoint system, at least one distance within the shared virtual environment between two or more objects, wherein the two or more objects include an avatar of an owner of the owned object and an avatar associated with a user of the endpoint system;

in response to determining that the at least one distance satisfies at least one proximity condition:
presenting, by the endpoint system, the owned object within the shared virtual environment in an interactive mode; and in response to determining that the distance does not satisfy the at least one proximity condition:
presenting, by the endpoint system, the owned object within the shared virtual environment in a limited-interaction mode;

wherein determining the at least one distance includes determining a first distance between the avatar associated with the user of the endpoint system and the avatar of the owner of the owned object; and wherein determining that the at least one distance satisfies at least one proximity condition includes determining that the first distance is less than a proximity threshold.

2. The system of claim 1, wherein the actions further comprise retrieving a set of permission conditions that include the at least one proximity condition from an environment information server using an identifier of the owned object.

3. The system of claim 2, wherein presenting the owned object in the interactive mode includes allowing input to the endpoint system to cause changes in state of the owned object as specified by the set of permission conditions.

4. The system of claim 2, wherein presenting the owned object in the limited-interaction mode includes preventing input to the endpoint system from causing changes in state of the owned object as specified by the set of permission conditions.

5. The system of claim 1, wherein presenting the owned object within the shared virtual environment in the interactive mode includes:
requesting a decryption key for a portion of the object data; and
decrypting the portion of the object data using the decryption key.

6. The system of claim 1, wherein the two or more objects further include the owned object;
wherein determining at least one distance includes determining a second distance between the owned object and the avatar of the owner of the owned object; and
wherein determining that the at least one distance satisfies at least one proximity condition includes determining that the second distance is less than a proximity threshold.

7. The system of claim 1, wherein the two or more objects further include a set of avatars other than the avatar associated with a user of the endpoint system and the avatar of the owner of the owned object, wherein the set of avatars had previously been interacting with the owned object;
wherein determining at least one distance includes determining distances between each avatar of the set of avatars and the owned object; and
wherein determining that the at least one distance satisfies at least one proximity condition includes determining that the distances between each avatar of the set of avatars and the owned object are each less than a proximity threshold.

8. The system of claim 1, wherein the display device, the at least one processor, and the non-transitory computer-readable medium are components of a smartphone computing device, a tablet computing device, a desktop computing device, or a laptop computing device.

9. A method of controlling access to an object within a shared virtual environment, the method comprising:
receiving, by a first endpoint system, object data indicating an owned object to be presented within the shared virtual environment;
determining, by the first endpoint system, at least one distance within the shared virtual environment between two or more objects, wherein the two or more objects include the owned object and an avatar of an owner of the owned object;
in response to determining that the at least one distance satisfies at least one proximity condition:
presenting, by the first endpoint system, the owned object within the shared virtual environment in an interactive mode; and
in response to determining that the distance does not satisfy the at least one proximity condition:
presenting, by the first endpoint system, the owned object within the shared virtual environment in a limited-interaction mode;
wherein determining the at least one distance includes determining a first distance between the owned object and the avatar of the owner of the owned object; and
wherein determining that the at least one distance satisfies at least one proximity condition includes determining that the first distance is less than a first proximity threshold.

10. The method of claim 9, further comprising retrieving, by the first endpoint system, a set of permission conditions that include the at least one proximity condition from an environment information server using an identifier of the owned object.

11. The method of claim 9, wherein the two or more objects further include an avatar associated with a user of the first endpoint system;
wherein determining at least one distance includes determining a second distance between the avatar of the owner of the owned object and the avatar associated with the user of the first endpoint system; and
wherein determining that the at least one distance satisfies at least one proximity condition includes determining that the second distance is less than a second proximity threshold.

12. The method of claim 11, wherein the two or more objects further include a set of avatars other than the avatar associated with a user of the first endpoint system and the avatar of the owner of the owned object, wherein the set of avatars had previously been interacting with the owned object;
wherein determining at least one distance includes determining distances between each avatar of the set of avatars and the owned object; and
wherein determining that the at least one distance satisfies at least one proximity condition includes determining that the distances between each avatar of the set of avatars and the owned object are each less than a third proximity threshold.

13. The method of claim 9, wherein presenting the owned object in the limited-interaction mode includes preventing input to the first endpoint system from causing changes in state of the owned object as specified by the set of permission conditions, and
wherein presenting the owned object in the interactive mode includes allowing input to the first endpoint system to cause changes in state of the owned object as specified by the set of permission conditions.

14. The method of claim 9, wherein presenting the owned object within the shared virtual environment in the interactive mode includes:
- requesting, by the first endpoint system, a decryption key for a portion of the object data; and
- decrypting, by the first endpoint system, the portion of the object data using the decryption key.

15. A non-transitory computer-readable medium having computer-executable instructions stored thereon that, in response to execution by one or more processors of a first endpoint system, cause the first endpoint system to perform actions comprising:
- receiving, by the first endpoint system, object data indicating an owned object to be presented within the shared virtual environment;
- determining, by the first endpoint system, at least one distance within the shared virtual environment between two or more objects, wherein the two or more objects include the owned object and an avatar of an owner of the owned object;
- in response to determining that the at least one distance satisfies at least one proximity condition:
  - presenting, by the first endpoint system, the owned object within the shared virtual environment in an interactive mode; and
- in response to determining that the distance does not satisfy the at least one proximity condition:
  - presenting, by the first endpoint system, the owned object within the shared virtual environment in a limited-interaction mode;
- wherein determining the at least one distance includes determining a first distance between the owned object and the avatar of the owner of the owned object; and
- wherein determining that the at least one distance satisfies at least one proximity condition includes determining that the first distance is less than a first proximity threshold.

16. The computer-readable medium of claim 15, wherein the actions further comprise retrieving, by the first endpoint system, a set of permission conditions that include the at least one proximity condition from an environment information server using an identifier of the owned object.

17. The computer-readable medium of claim 15, wherein the two or more objects further include an avatar associated with a user of the first endpoint system;
- wherein determining at least one distance includes determining a second distance between the avatar of the owner of the owned object and the avatar associated with the user of the first endpoint system; and
- wherein determining that the at least one distance satisfies at least one proximity condition includes determining that the second distance is less than a second proximity threshold.

18. The computer-readable medium of claim 17, wherein the two or more objects further include a set of avatars other than the avatar associated with a user of the first endpoint system and the avatar of the owner of the owned object, wherein the set of avatars had previously been interacting with the owned object;
- wherein determining at least one distance includes determining distances between each avatar of the set of avatars and the owned object; and
- wherein determining that the at least one distance satisfies at least one proximity condition includes determining that the distances between each avatar of the set of avatars and the owned object are each less than a third proximity threshold.

19. The computer-readable medium of claim 15, wherein presenting the owned object in the limited-interaction mode includes preventing input to the first endpoint system from causing changes in state of the owned object as specified by the set of permission conditions, and
- wherein presenting the owned object in the interactive mode includes allowing input to the first endpoint system to cause changes in state of the owned object as specified by the set of permission conditions.

20. The computer-readable medium of claim 15, wherein presenting the owned object within the shared virtual environment in the interactive mode includes:
- requesting, by the first endpoint system, a decryption key for a portion of the object data; and
- decrypting, by the first endpoint system, the portion of the object data using the decryption key.

* * * * *